United States Patent
Zhang et al.

(10) Patent No.: US 12,282,637 B2
(45) Date of Patent: Apr. 22, 2025

(54) TOUCH DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yuanqi Zhang, Beijing (CN); Yi Zhang, Beijing (CN); Chang Luo, Beijing (CN); Shun Zhang, Beijing (CN); Yu Wang, Beijing (CN); Wei Wang, Beijing (CN); Ping Wen, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/245,538

(22) PCT Filed: Jun. 9, 2022

(86) PCT No.: PCT/CN2022/097765
§ 371 (c)(1),
(2) Date: Mar. 15, 2023

(87) PCT Pub. No.: WO2023/236131
PCT Pub. Date: Dec. 14, 2023

(65) Prior Publication Data
US 2024/0288975 A1    Aug. 29, 2024

(51) Int. Cl.
*G06F 3/044* (2006.01)
(52) U.S. Cl.
CPC .. *G06F 3/0446* (2019.05); *G06F 2203/04111* (2013.01); *G06F 2203/04112* (2013.01)

(58) Field of Classification Search
CPC .... G06F 3/0448; G06F 3/0443; G06F 3/0412; G06F 3/0446; G06F 2203/04103;
(Continued)

(56) References Cited

U.S. PATENT DOCUMENTS 11,442,587 B2 * 9/2022 Song .................. G06F 3/04164
11,604,553 B2 * 3/2023 Song ..................... G06F 3/0448
(Continued)

FOREIGN PATENT DOCUMENTS

CN    202904529 U    4/2013
CN    103294242 A    9/2013
(Continued)

OTHER PUBLICATIONS

WO-2022088077.*
(Continued)

*Primary Examiner* — Olga V Merkoulova
(74) *Attorney, Agent, or Firm* — Intellectual Valley Law, P.C.

(57) ABSTRACT

A touch display panel is provided. The touch display panel includes a plurality of first mesh electrodes and a plurality of second mesh electrodes. A respective one of the plurality of first mesh electrodes includes a plurality of first mesh blocks consecutively electrically connected along a first direction. Two adjacent first mesh blocks of the plurality of first mesh blocks are electrically connected to each other through a respective first conductive bridge of a plurality of first conductive bridges. The plurality of first conductive bridges are arranged in an array. The plurality of first mesh blocks includes a border mesh block adjacent to a truncated region in which a touch control structure is absent. The touch display panel includes a displaced conductive bridge which is displaced from the array of the plurality of first conductive bridges.

17 Claims, 25 Drawing Sheets

(58) Field of Classification Search
CPC .. G06F 2203/04112; G06F 2203/04111; G06F 3/044; H05K 1/147; H05K 1/028
See application file for complete search history.

(56) References Cited

U.S. PATENT DOCUMENTS

| | | | |
|---|---|---|---|
| 11,941,213 B2* | 3/2024 | Wang | G06F 3/0412 |
| 2015/0309605 A1* | 10/2015 | Hsu | G06F 3/0443 |
| | | | 345/173 |
| 2017/0052619 A1 | 2/2017 | Park et al. | |
| 2018/0233541 A1 | 8/2018 | Zeng et al. | |
| 2019/0079622 A1* | 3/2019 | Choi | G06F 3/047 |
| 2021/0357079 A1* | 11/2021 | Song | G06F 3/0412 |
| 2022/0317814 A1 | 10/2022 | Wu et al. | |
| 2022/0350446 A1* | 11/2022 | Song | G06F 3/0448 |
| 2022/0384533 A1* | 12/2022 | Jang | H10K 59/40 |
| 2023/0049340 A1* | 2/2023 | Wang | G06F 3/0412 |
| 2024/0241410 A1* | 7/2024 | Tian | G02F 1/133512 |

FOREIGN PATENT DOCUMENTS

| | | |
|---|---|---|
| CN | 105022513 A | 11/2015 |
| CN | 105138200 A | 12/2015 |
| CN | 205282048 U | 6/2016 |
| CN | 106354298 A | 1/2017 |
| CN | 106873839 A | 6/2017 |
| CN | 107104077 A | 8/2017 |
| CN | 107797712 A | 3/2018 |
| CN | 108920010 A | 11/2018 |
| CN | 112968033 A | 6/2021 |
| CN | 113377232 A | 9/2021 |
| JP | 2017091018 A | 5/2017 |
| WO | WO-2022062843 A1 * | 3/2022 ........... G06F 3/0412 |
| WO | WO-2022088077 A1 * | 5/2022 ......... G02F 1/13338 |

OTHER PUBLICATIONS

International Search Report & Written Opinion mailed Feb. 16, 2023, regarding PCT/CN2022/097765.

S. Kim et al., "Low-Cost Fabrication Method for Thin, Flexible, and Transparent Touch Screen Sensors", Advanced Materials Technologies, 2020, 5, 2000441, DOI: 10.1002/admt.202000441.

* cited by examiner

TOUCH DISPLAY PANEL AND DISPLAY APPARATUS

CROSS-REFERENCE TO RELATED APPLICATION

This application is a national stage application under 35 U.S.C. § 371 of International Application No. PCT/CN2022/097765, filed Jun. 9, 2022, the contents of which are incorporated by reference in the entirety.

TECHNICAL FIELD

The present invention relates to display technology, more particularly, to a touch display panel and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch display panel, comprising a plurality of first mesh electrodes and a plurality of second mesh electrodes; wherein a respective one of the plurality of first mesh electrodes comprises a plurality of first mesh blocks consecutively electrically connected along a first direction; two adjacent first mesh blocks of the plurality of first mesh blocks are electrically connected to each other through a respective first conductive bridge of a plurality of first conductive bridges; and the plurality of first conductive bridges are arranged in an array; wherein the plurality of first mesh blocks comprises a border mesh block adjacent to a truncated region in which a touch control structure is absent; and the touch display panel comprises a displaced conductive bridge which is displaced from the array of the plurality of first conductive bridges.

Optionally, the displaced conductive bridge is displaced from an array position to a non-array position; the array position and positions of the plurality of first conductive bridges are arranged in rows and columns; and the non-array position is displaced from the array of rows and columns.

Optionally, the array position is where the touch display panel has a slope greater than an average slope of the touch display panel; and the non-array position is where the touch display panel has a slope smaller than the slope of the touch display panel at the array position.

Optionally, the border mesh block has a structure different from at least one first mesh block of the plurality of first mesh blocks in that the border mesh block comprises an extended portion at the array position; and mesh lines of the extended portion are in a same layer as mesh lines of the border mesh block outside of the extended portion, and is in a different layer from a first conductive bridge electrically connected to the at least one first mesh block.

Optionally, the truncated region is a window region; the window region is at least partially surrounded by a touch control region; and the touch control structure is limited in the touch control region and absent in the window region.

Optionally, the border mesh block comprises an extended portion; and the plurality of first conductive bridges are in a same array comprising rows and columns; and the extended portion and the plurality of first conductive bridges are at a plurality of array positions of the same array, respectively.

Optionally, the border mesh block comprises an extended portion; wherein the displaced conductive bridge comprises one or more first conductive extensions electrically connected to the extended portion, the one or more first conductive extensions extending away from the extended portion toward the window region; and one or more first conductive plates connected to the one or more first conductive extensions, the one or more first conductive plates at least partially surrounding the window region; wherein the one or more first conductive plates are electrically connected to a mesh block of the plurality of first mesh electrodes, the mesh block on a different side of the window region from the border mesh block.

Optionally, the one or more first conductive extensions are in a first mesh line layer; the one or more first conductive plates, the border mesh block, the mesh block, mesh blocks of the plurality of first mesh electrodes, and mesh blocks of the plurality of second mesh electrodes are in a second mesh line layer; and the touch display panel further comprises a touch insulating layer between the first mesh line layer and the second mesh line layer.

Optionally, the displaced conductive bridge further comprises a first capacitance compensating conductive plate along an edge of the extended portion adjacent to the window region; and the first capacitance compensating conductive plate is directly connected to at least one mesh line of the extended portion, and is connected to the one or more first conductive extensions through a via extending through a touch insulating layer.

Optionally, the border mesh block spaces apart two adjacent second mesh blocks of a plurality of second mesh blocks of a respective one of the plurality of second mesh electrodes; and a first adjacent second mesh block of the two adjacent second mesh blocks, the border mesh block, and a second adjacent second mesh block of the two adjacent second mesh blocks sequentially surround portions of a perimeter of the window region.

Optionally, the respective one of the plurality of second mesh electrodes comprises a second capacitance compensating conductive plate, a second conductive plate, and a third capacitance compensating conductive plate sequentially connected; the second capacitance compensating conductive plate is directly connected to at least one mesh line of the first adjacent second mesh block; the third capacitance compensating conductive plate is directly connected to at least one mesh line of the second adjacent second mesh block; and the second conductive plate connects the second capacitance compensating conductive plate with the third capacitance compensating conductive plate.

Optionally, the second capacitance compensating conductive plate, the second conductive plate, and the third capacitance compensating conductive plate are parts of a unitary structure.

Optionally, the one or more first conductive extensions are in a first mesh line layer; the second capacitance compensating conductive plate, the second conductive plate, and the third capacitance compensating conductive plate are in a second mesh line layer; and the one or more first conductive extensions crosses over the second conductive plate.

Optionally, on a first side, the first adjacent second mesh block, the border mesh block, and the second adjacent second mesh block are adjacent to the window region; on a second side, the first adjacent second mesh block, the border mesh block, and the second adjacent second mesh block are along an edge of the touch control structure; the touch display panel further comprises a first trace line electrically connecting the border mesh block to a touch control integrated circuit, the first trace directly connected to at least one mesh line of the border mesh block; one or more second conductive extensions electrically connected to the first adjacent second mesh block, the one or more second conductive extensions extending away from the first adjacent second mesh block away from the window region; one or more third conductive extensions electrically connected to the second adjacent second mesh block, the one or more third conductive extensions extending away from the second adjacent second mesh block away from the window region; and a connecting line connecting the one or more second conductive extensions with the one or more third conductive extensions.

Optionally, the one or more second conductive extensions, the connecting line, and the one or more third conductive extensions are parts of a unitary structure in a first mesh line layer; and the first trace line, the first adjacent second mesh block, the border mesh block, and the second adjacent second mesh block are in a second mesh line layer.

Optionally, the border mesh block is in a corner region of the touch display panel; and the truncated region is a region outside the touch control structure and adjacent to the corner region.

Optionally, the displaced conductive bridge comprises one or more fourth conductive extensions electrically connected to the border mesh block, the one or more fourth conductive extensions extending away from the border mesh block toward the region outside the touch control structure; and the one or more fourth conductive extensions are electrically connected to a second trace line, the second trace line electrically connected to a touch control integrated circuit.

Optionally, the displaced conductive bridge further comprises a fourth capacitance compensating conductive plate directly connected to at least one mesh line of the border mesh block; the fourth capacitance compensating conductive plate is electrically connected to the one or more fourth conductive extensions; the one or more fourth conductive extensions are in a first mesh line layer; and the border mesh block, the fourth capacitance compensating conductive plate, and the second trace line are in a second mesh line layer.

Optionally, the touch display panel further comprises a third trace line electrically connected to a mesh block of the plurality of second mesh electrodes; wherein the third trace line is between the second trace line and the border mesh block; and the one or more fourth conductive extensions cross over the third trace line.

Optionally, a line width of mesh lines of the displaced conductive bridge is greater than a line width of mesh lines of the plurality of first conductive bridges.

In another aspect, the present disclosure provides a display apparatus, comprising a display panel and the touch display panel described herein or fabricated by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch display panel and a display apparatus that substantially obviate one or more of the problems due to limitations and disadvantages of the related art. In one aspect, the present disclosure provides a touch display panel. In some embodiments, the touch display panel includes a plurality of first mesh electrodes and a plurality of second mesh electrodes. Optionally, a respective one of the plurality of first mesh electrodes comprises a plurality of first mesh blocks consecutively electrically connected along a first direction. Optionally, two adjacent first mesh blocks of the plurality of first mesh blocks are electrically connected to each other through a respective first conductive bridge of a plurality of first conductive bridges. Optionally, the plurality of first conductive bridges are arranged in an array. Optionally, the plurality of first mesh blocks comprises a border mesh block adjacent to a truncated region in which the touch control structure is absent. Optionally, the touch display panel comprises a displaced conductive bridge which is displaced from the array of the plurality of first conductive bridges.

In some embodiments, the touch display panel includes a touch control structure. Flexible multi-layer on-cell touch (FMLOC) technology is utilized to form mesh electrode pattern on top of an encapsulating layer of the touch display panel. The mesh electrode pattern includes touch scanning electrodes and touch sensing electrodes, and optionally fill patterns ("dummy patterns"). A touch detection integrated circuit is configured to detect a touch by sensing a mutual capacitance between a touch scanning electrode and a touch sensing electrode, and a change of the mutual capacitance upon a touch.

Figure 1:
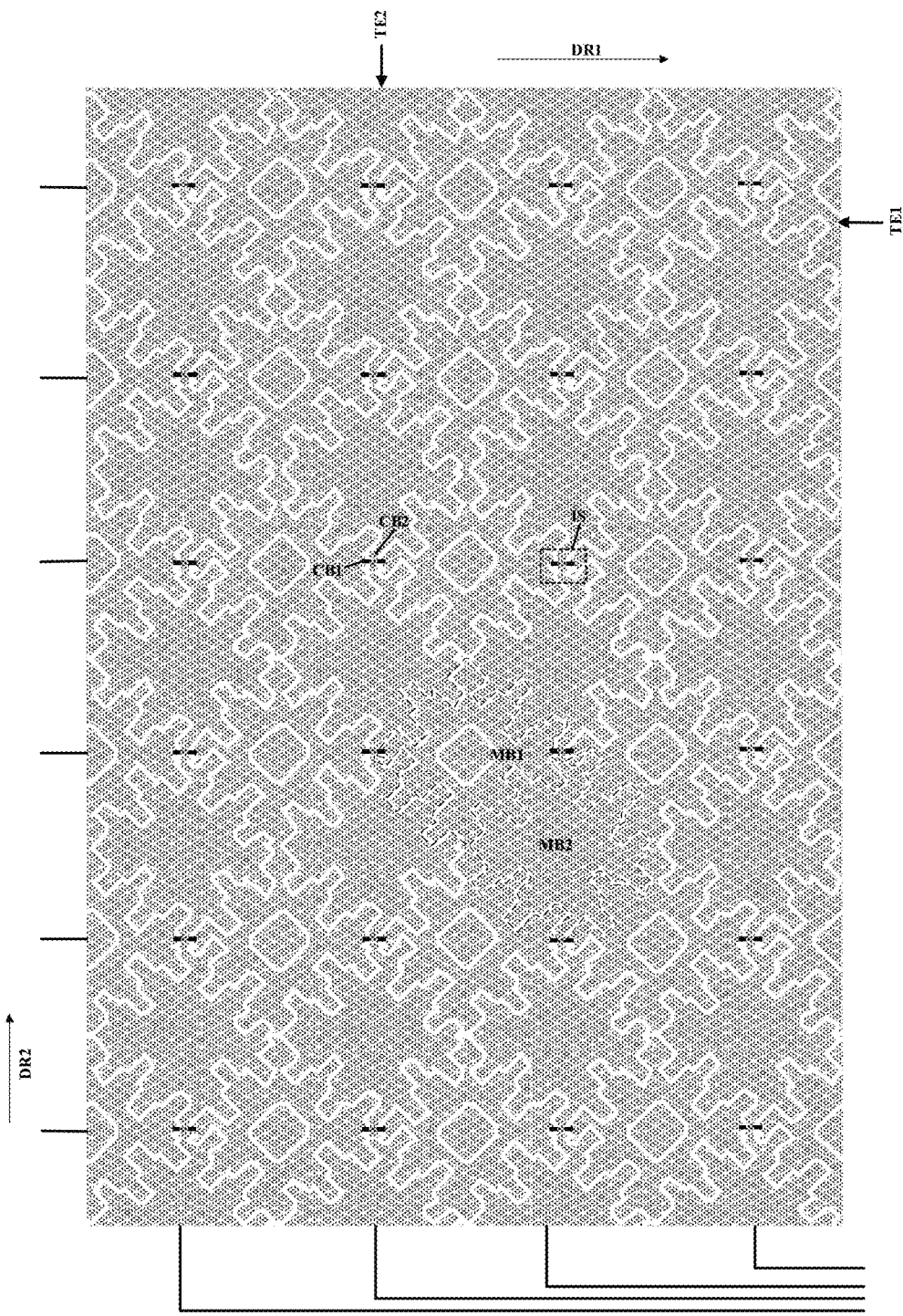
FIG. 1 is a schematic diagram illustrating the structure of a touch control structure in some embodiments according to the present disclosure.

FIG. 1 is a schematic diagram illustrating the structure of a touch control structure in some embodiments according to the present disclosure. Referring to FIG. 1, the touch control structure in some embodiments includes a plurality of first mesh electrodes TE1 arranged in a plurality of rows and a plurality of second mesh electrodes TE2 arranged in a plurality of columns. The plurality of first mesh electrodes TE1 are arranged in a plurality of rows, each of the plurality of rows is a respective one of the plurality of first mesh electrodes TE1. The plurality of second mesh electrodes TE2 arranged in a plurality of columns, each of the plurality of columns is a respective one of the plurality of second mesh electrodes TE2. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

As shown in FIG. 1, a respective one of the plurality of first mesh electrodes TE1 includes a plurality of first mesh blocks MB1 consecutively electrically connected in a respective row along a first direction DR1, a respective one of the plurality of second mesh electrodes TE2 includes a plurality of second mesh blocks MB2 consecutively electrically connected in a respective column along a second direction DR2. In FIG. 1, a respective one of the plurality of first mesh blocks MB1 and a respective one of the plurality of second mesh blocks MB2 are depicted as blocks respectively encircled by dotted lines.

In some embodiments, two adjacent first mesh blocks of the plurality of first mesh blocks MB1 are electrically connected to each other through a respective first conductive bridge RCB1 of a plurality of first conductive bridges. The plurality of first conductive bridges are located in a plurality of intersections. A respective intersection IS of the plurality of intersections is where two adjacent first mesh blocks of the plurality of first mesh blocks MB1 of a respective one of the plurality of first mesh electrodes TE1 electrically connect to each other, and where two adjacent second mesh blocks of the plurality of second mesh blocks MB2 of a respective one of the plurality of second mesh electrodes TE2 electrically connect to each other.

In some embodiments, the plurality of first conductive bridges are in a first mesh line layer; while the plurality of first mesh blocks MB1 and the plurality of second mesh blocks MB2 are in a second mesh line layer.

In some embodiments, two adjacent second mesh blocks of the plurality of second mesh blocks MB2 are electrically connected to each other through a respective second conductive bridge RCB2 of a plurality of second conductive bridges. Optionally, the plurality of first conductive bridges are in a first mesh line layer; while the plurality of first mesh blocks MB1, the plurality of second mesh blocks MB2, and the plurality of second conductive bridges are in a second mesh line layer. The respective first conductive bridge RCB1 cross over the respective second conductive bridge RCB2.

Figure 2A:
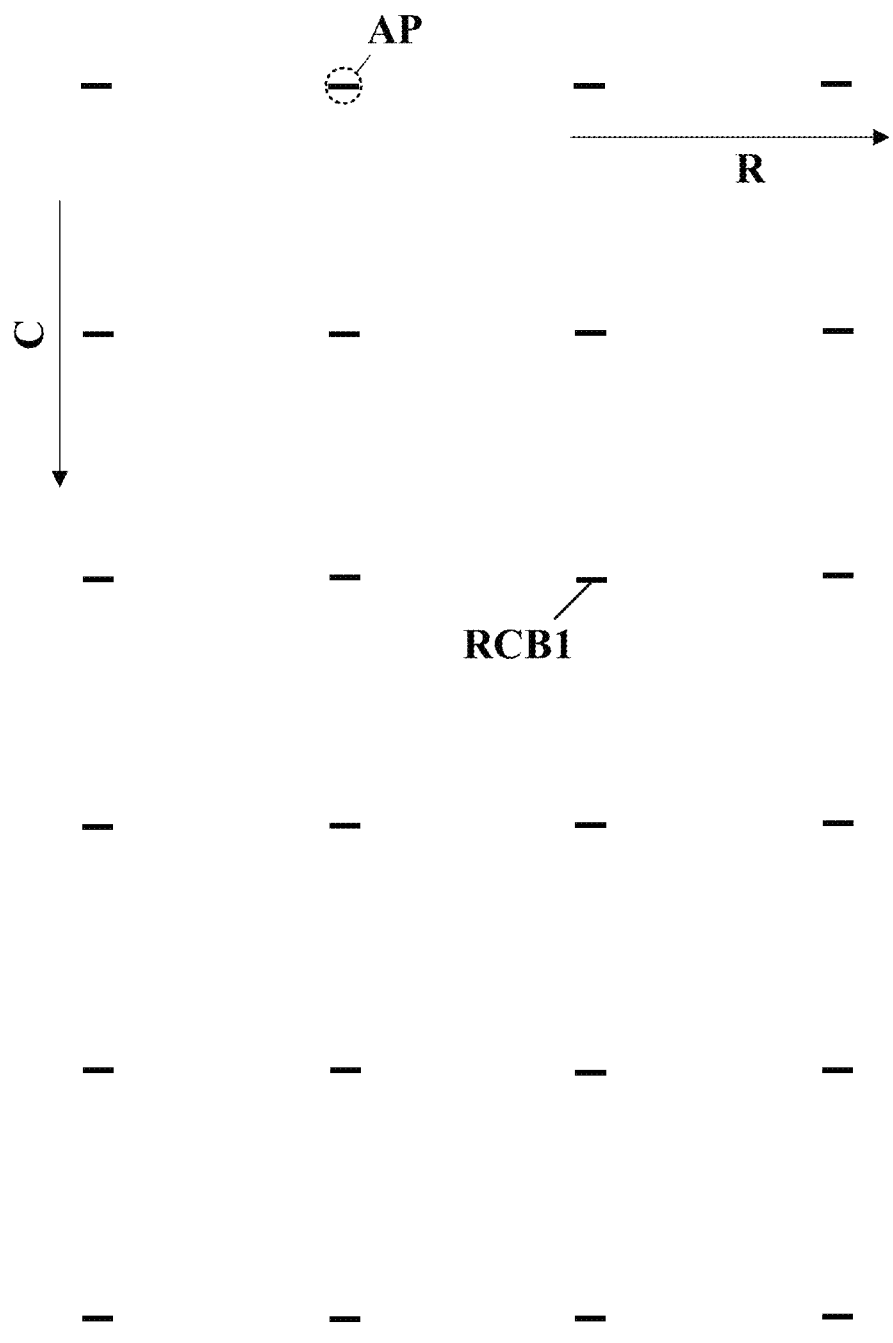
FIG. 2A shows an array of the plurality of first conductive bridges in some embodiments according to the present disclosure.

FIG. 2A shows an array of the plurality of first conductive bridges in some embodiments according to the present disclosure. Referring to FIG. 2A, the plurality of first conductive bridges are arranged in an array comprising a plurality of rows R and a plurality of columns C. The plurality of rows R and the plurality of columns C intersect with each other. The plurality of first conductive bridges occupy a plurality of array positions, respectively.

Figure 2B:
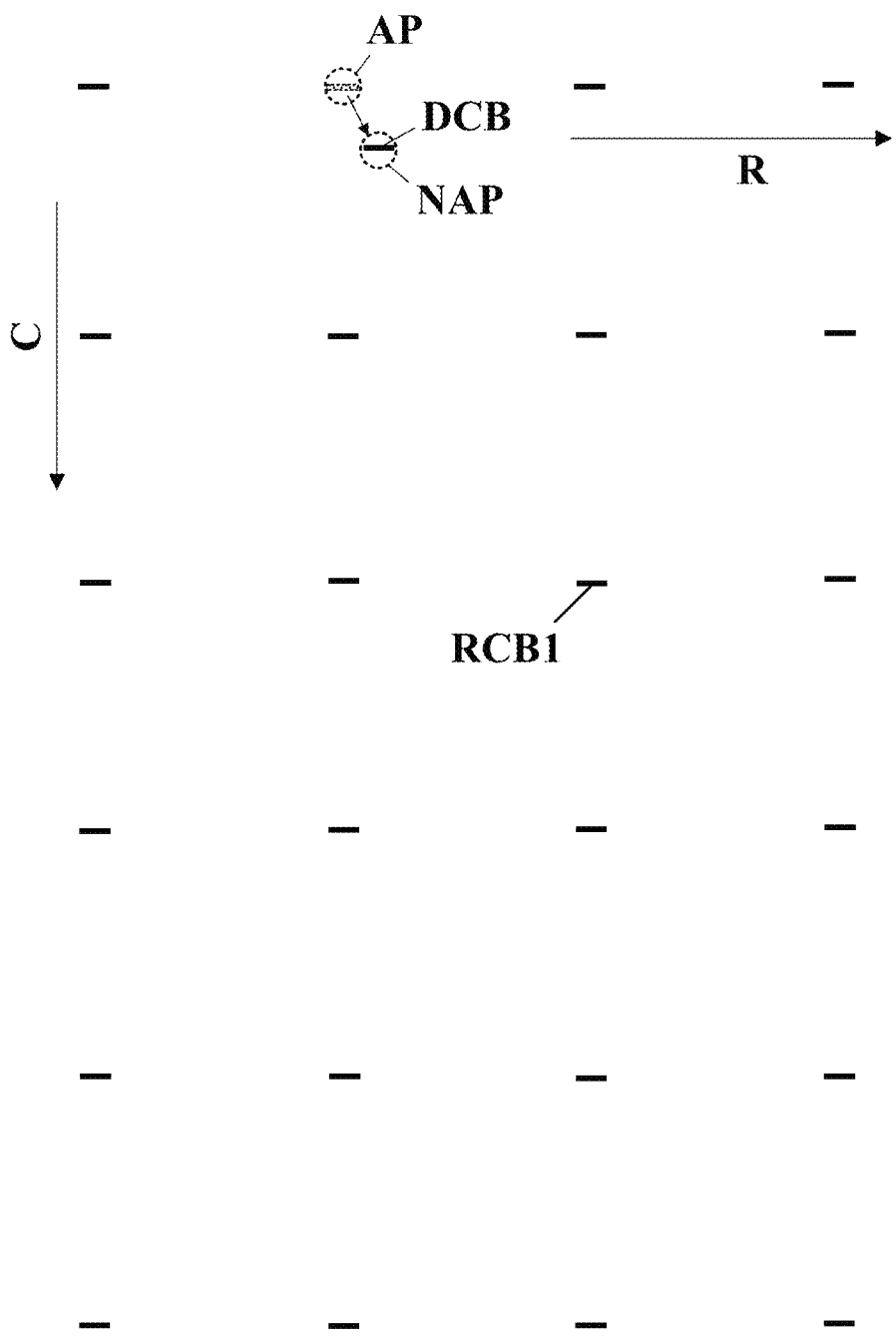
FIG. 2B illustrates an example of a displaced conductive bridge which is displaced from the array of the plurality of first conductive bridges.

FIG. 2B illustrates an example of a displaced conductive bridge which is displaced from the array of the plurality of first conductive bridges. Referring to FIG. 2B, a displaced conductive bridge DCB is displaced from the array of the plurality of first conductive bridges from an array position AP to a non-array position NAP. The array position AP and positions of the plurality of first conductive bridges are arranged in rows and columns of the array. The non-array position NAP is displaced from the array of rows and columns.

In some embodiments, the displaced conductive bridge DCB is displaced from the array position AP to the non-array position NAP by at least 10 µm, e.g., at least 20 µm, at least 30 µm, at least 40 µm, at least 50 µm, at least 60 µm, at least 70 µm, at least 80 µm, at least 90 µm, at least 100 µm, at least 150 µm, at least 200 µm, at least 250 µm, at least 300 µm, at least 350 µm, at least 400 µm, at least 450 µm, at least 500 µm, at least 550 µm, at least 600 µm, at least 650 µm, at least 700 µm, at least 750 µm, at least 800 µm, at least 850 µm, at least 900 µm, at least 950 µm, at least 1000 µm, at least 1.5 mm, at least 2.0 mm, at least 2.5 mm, at least 3.0 mm, at least 3.5 mm, at least 4.0 mm, at least 4.5 mm, at least 5.0 mm, at least 5.5 mm, at least 6.0 mm, at least 6.5 mm, at least 7.0 mm, at least 7.5 mm, at least 8.0 mm, at least 8.5 mm, at least 9.0 mm, or at least 10.0 mm.

Figure 3A:
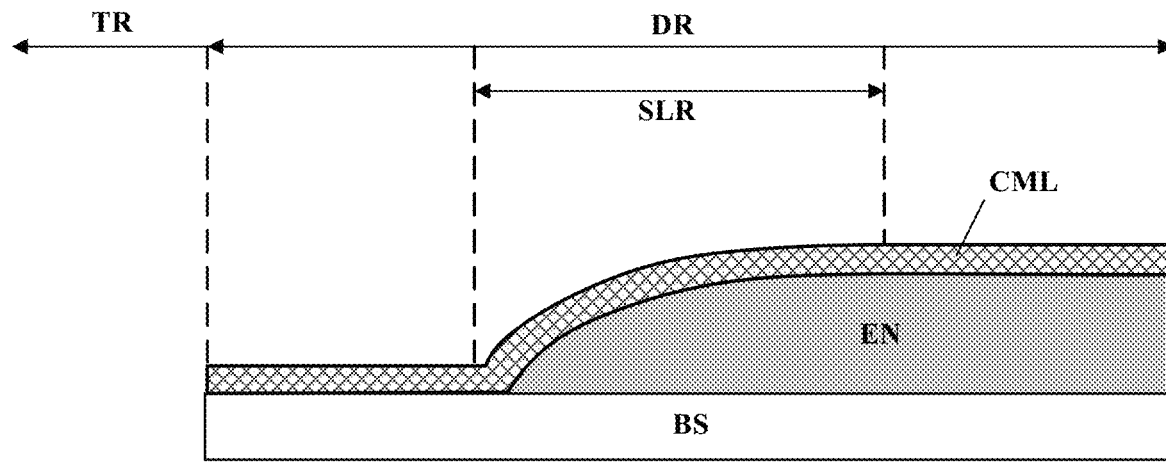
FIG. 3A to FIG. 3E illustrates a process of fabricating a mesh line layer in a touch control structure in some embodiments according to the present disclosure.
Figure 3B:
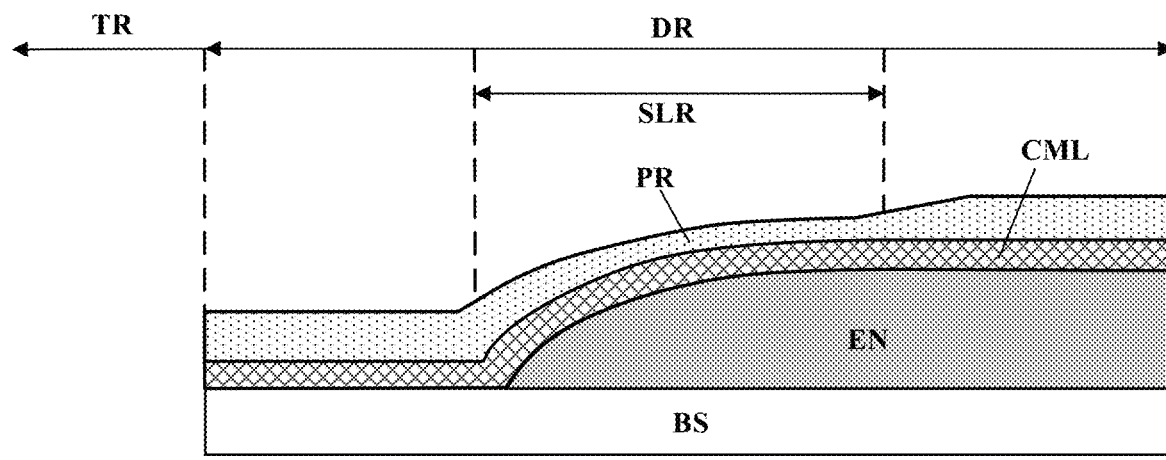
Figure 3C:
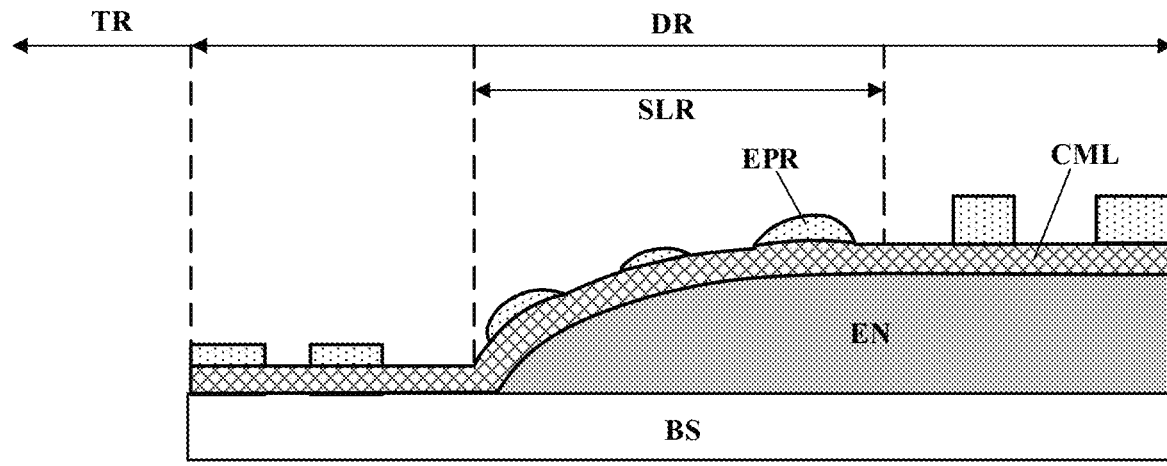
Figure 3D:
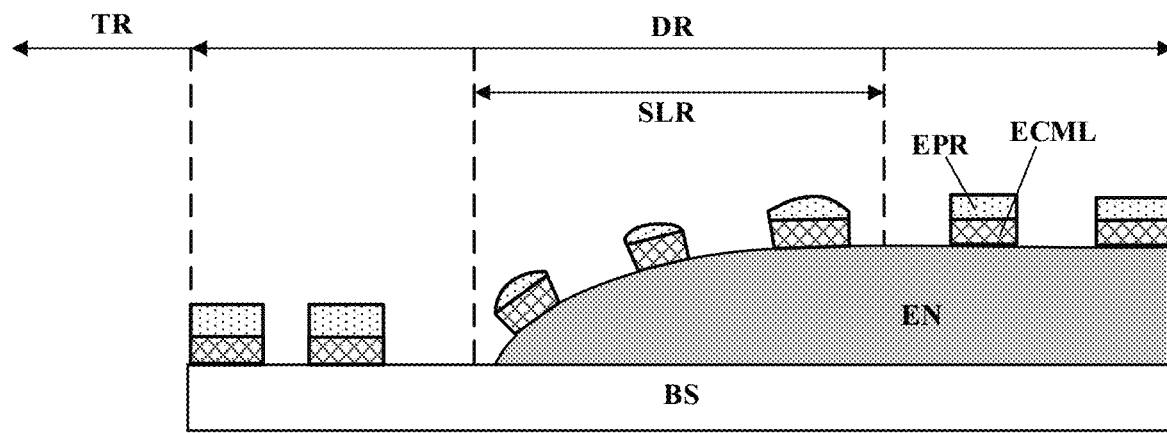
Figure 3E:
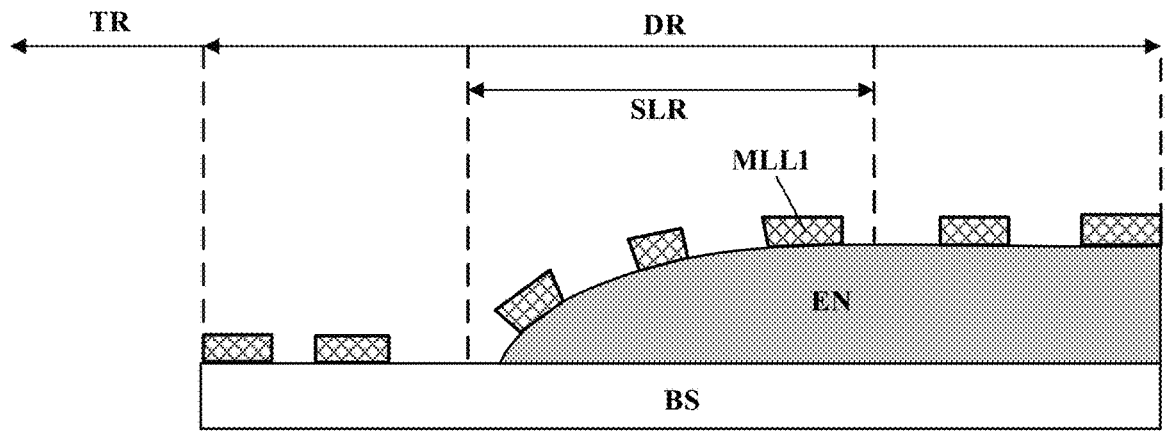

FIG. 3A to FIG. 3E illustrates a process of fabricating a mesh line layer in a touch control structure in some embodiments according to the present disclosure. FIG. 3A to FIG. 3E illustrates a fabricating process in a display region DR adjacent to a truncated region TR in which the touch control structure (e.g., mesh lines of touch electrodes) is absent. Referring to FIG. 3A, an encapsulating layer EN is formed on a base substrate BS, and a conductive material layer CML is formed on a side of the encapsulating layer EN away from the base substrate BS. The encapsulating layer EN has a large slope in a slope region SLR adjacent to the truncated region TR, at least partially due to an organic encapsulating sub-layer of the encapsulating layer EN. Referring to FIG. 3B, a photoresist layer PR is formed on a side of the conductive material layer CML away from the base substrate BS. When forming the photoresist layer PR in the slope region SLR, it is difficult to maintain the photoresist material on the slope in the slope region SLR, due to gravity and the large slope in this region. As a result, the photoresist material flows toward a bottom of the slope, resulting in that the photoresist material in the slope region SLR is insufficiently applied. Referring to FIG. 3C, the photoresist layer PR is exposed and developed using a mask plate, resulting in an exposed photoresist layer EPR. Referring to FIG. 3D, the conductive material layer CML is etched to form an etched conductive material layer ECML. Referring to FIG. 3E, the exposed photoresist layer EPR is then removed, thereby forming a first mesh line layer MLL1. When fabricated using a mask plate, the mesh lines of the first mesh line layer MLL1 have a critical dimension in the slope region SLR (where the photoresist material is insufficiently applied) smaller than a critical dimension in the display region DR. The mesh lines of the first mesh line layer MLL1 formed in the slope region SLR are prone to line break.

Once the first mesh line layer MLL1 is formed, a touch insulating layer is formed on the first mesh line layer MLL1, and a second mesh line layer is formed on a side of the touch insulating layer away from the first mesh line layer MLL1. Due to the large slope in the slope region SLR, similar problems occurs to the mesh lines of the second mesh line layer. The mesh lines of the second mesh line layer are even more prone to line break.

Figure 4:
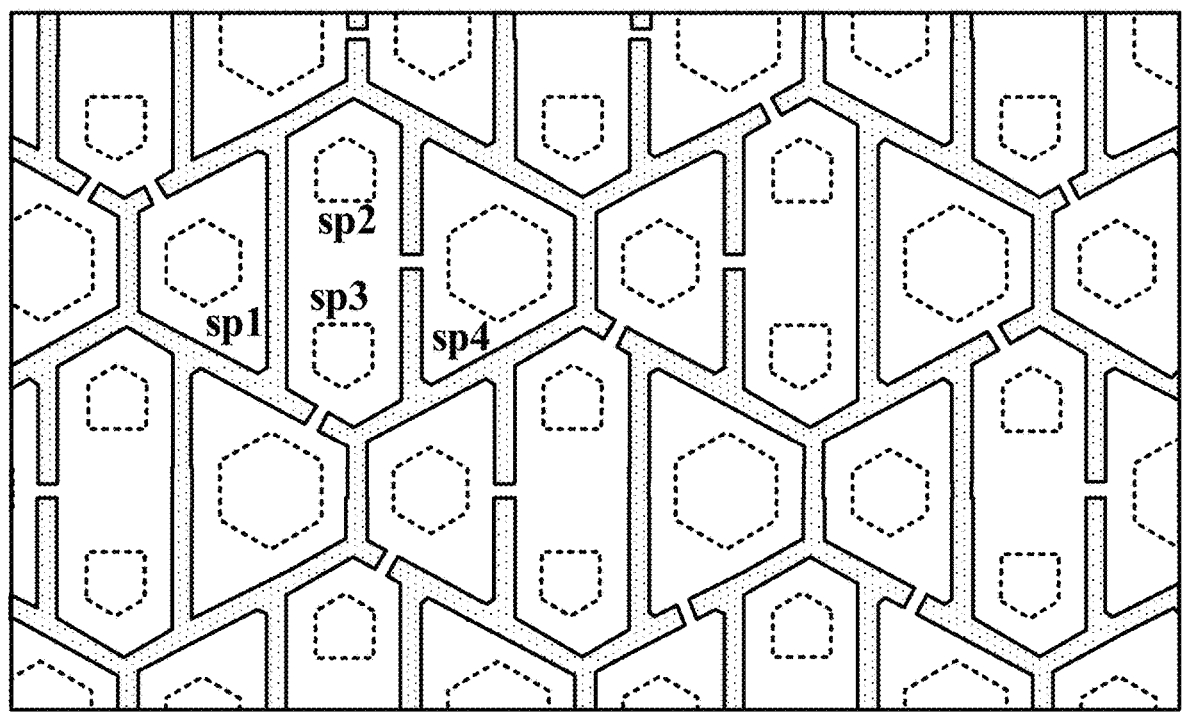
FIG. 4 illustrates an arrangement of a touch control structure relative to a plurality of subpixels in a display panel comprising the touch control structure in some embodiments according to the present disclosure.

FIG. 4 illustrates an arrangement of a touch control structure relative to a plurality of subpixels in a display panel comprising the touch control structure in some embodiments according to the present disclosure. Referring to FIG. 4, in one example, the plurality of subpixels includes a respective first subpixel sp1, a respective second subpixel sp2, a respective third subpixel sp3, and a respective fourth subpixel sp4. Optionally, a respective pixel of the display panel includes the respective first subpixel sp1, the respective second subpixel sp2, the respective third subpixel sp3, and the respective fourth subpixel sp4. The plurality of subpixels in the display panel are arranged in an array. In one example, the array of the plurality of subpixels includes a S1-S2-S3-S4 format repeating array, in which S1 stands for the respective first subpixel sp1, S2 stands for the respective second subpixel sp2, S3 stands for the respective third subpixel sp3, and S4 stands for the respective fourth subpixel sp4. In another example, the S1-S2-S3-S4 format is a C1-C2-C3-C4 format, in which C1 stands for the respective first subpixel sp1 of a first color, C2 stands for the respective second subpixel sp2 of a second color, C3 stands for the respective third subpixel sp3 of a third color, and C4 stands for the respective fourth subpixel sp4 of a fourth color. In another example, the S1-S2-S3-S4 format is a C1-C2-C3-C2' format, in which C1 stands for the respective first subpixel sp1 of a first color, C2 stands for the respective second subpixel sp2 of a second color, C3 stands for the respective third subpixel sp3 of a third color, and C2' stands for the respective fourth subpixel sp4 of the second color. In another example, the C1-C2-C3-C2' format is a R-G-B-G format, in which the respective first subpixel sp1 is a red subpixel, the respective second subpixel sp2 is a green subpixel, the respective third subpixel sp3 is a green subpixel, and the respective fourth subpixel sp4 is a blue subpixel. The dotted lines in FIG. 4 indicate subpixel apertures defined by a pixel definition layer.

Figure 5:
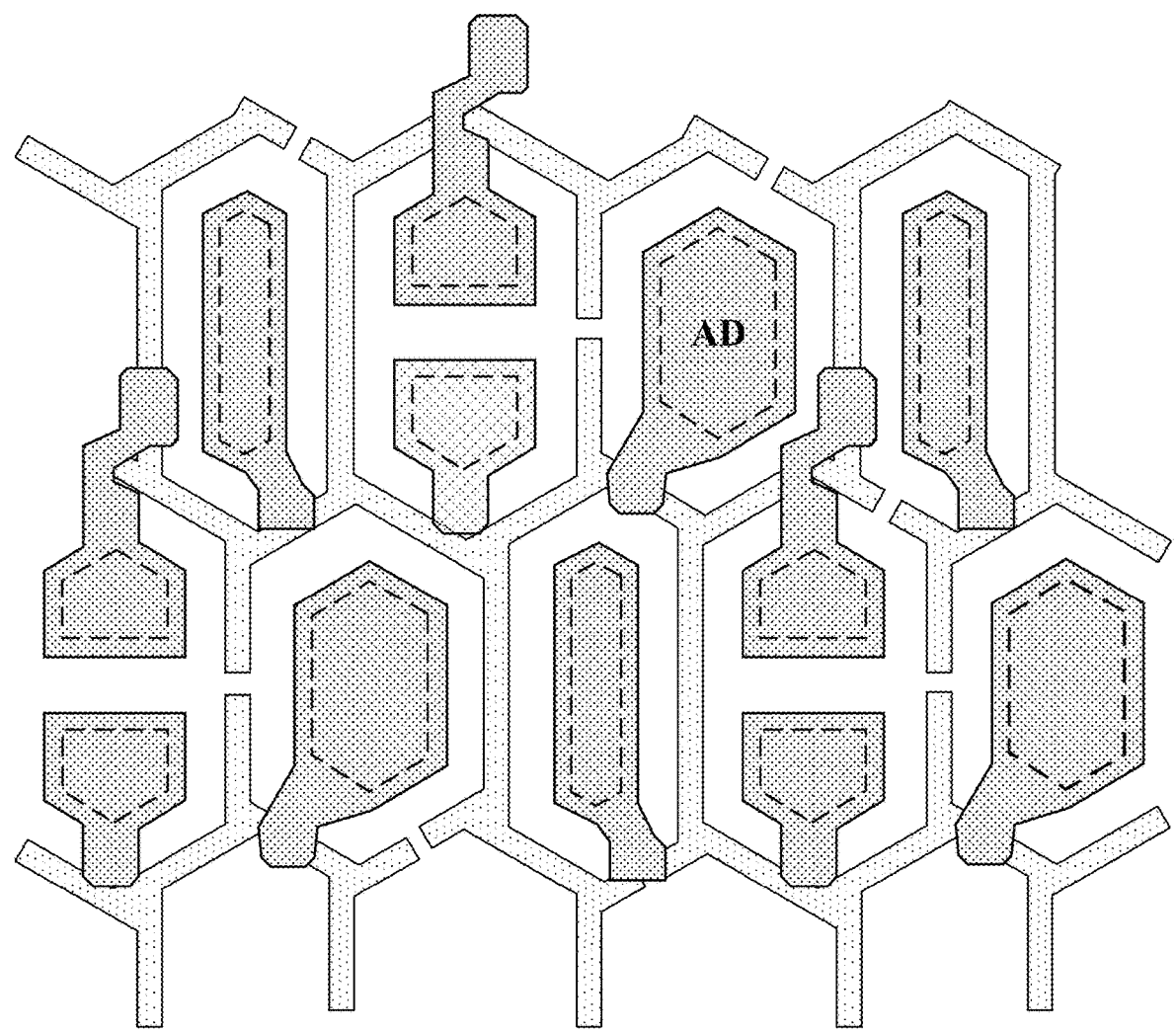
FIG. 5 illustrates an arrangement of a touch control structure relative to a plurality of anodes in a display panel comprising the touch control structure in some embodiments according to the present disclosure.

Referring to FIG. 4 in some embodiments, the mesh lines of the touch control structure are limited in an inter-subpixel region of the display panel. For example, all mesh lines of the plurality of first mesh blocks, the plurality of second mesh blocks, the plurality of connecting mesh blocks, the plurality of first single mesh lines, and the plurality of second single mesh lines are limited in the inter-subpixel region. FIG. 5 illustrates an arrangement of a touch control structure relative to a plurality of anodes in a display panel comprising the touch control structure in some embodiments according to the present disclosure. A plurality of anodes AD are denoted in FIG. 5.

Figure 6:
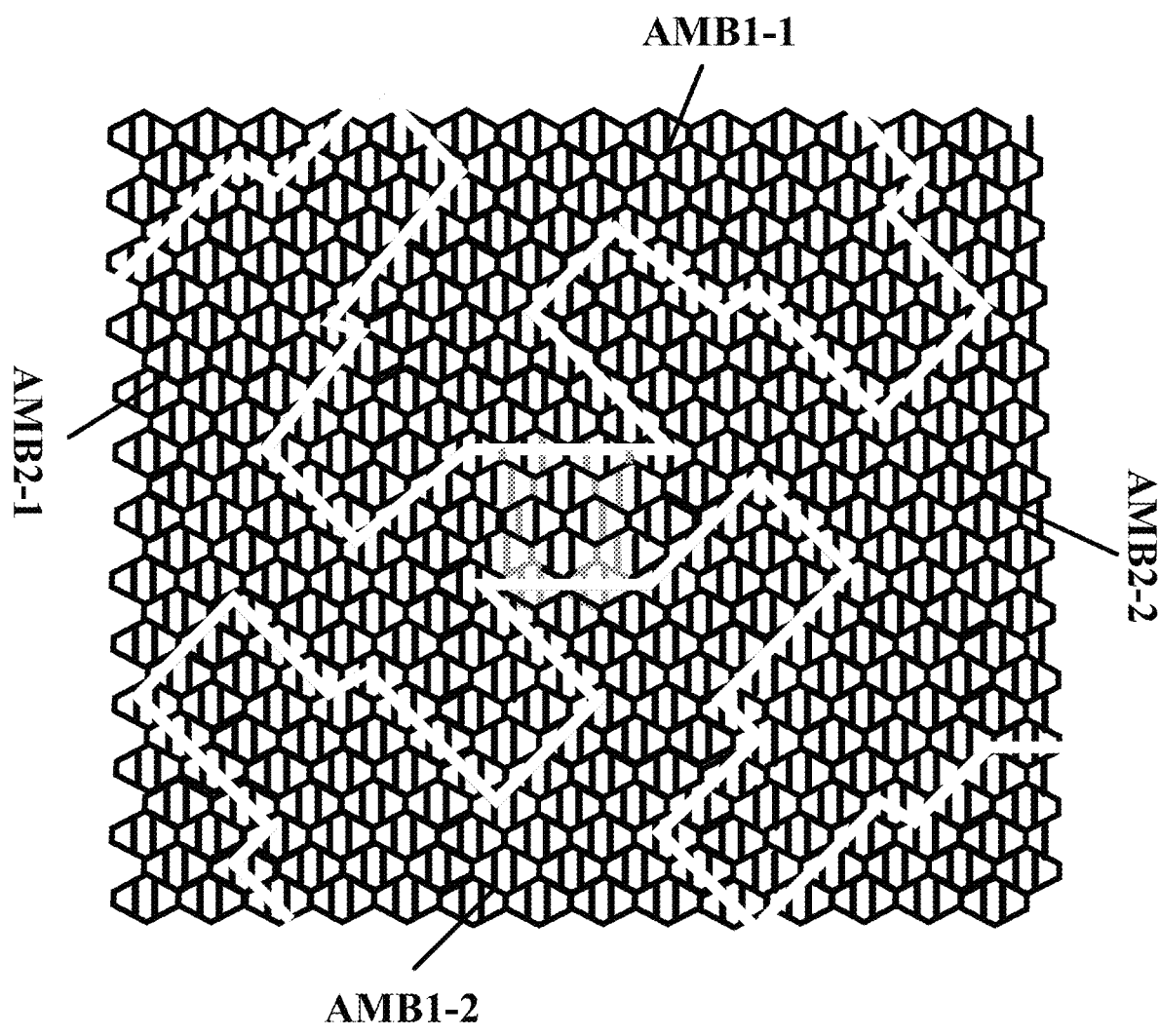
FIG. 6 illustrates the structure of a touch control structure in a region where a respective first mesh electrode crosses over a respective second mesh electrode.

FIG. 6 illustrates the structure of a touch control structure in a region where a respective first mesh electrode crosses over a respective second mesh electrode. Referring to FIG. 6, two adjacent first mesh blocks of the plurality of first mesh blocks of a respective one of the plurality of first mesh electrodes electrically connect to each other, and two adjacent second mesh blocks of the plurality of second mesh blocks of a respective one of the plurality of second mesh electrodes electrically connect to each other. In one example, the two adjacent first mesh blocks includes a first adjacent first mesh block AMB1-1 and a second adjacent first mesh block AMB1-2; and the two adjacent second mesh blocks includes a first adjacent second mesh block AMB2-1 and a second adjacent second mesh block AMB2-2.

Figure 7A:
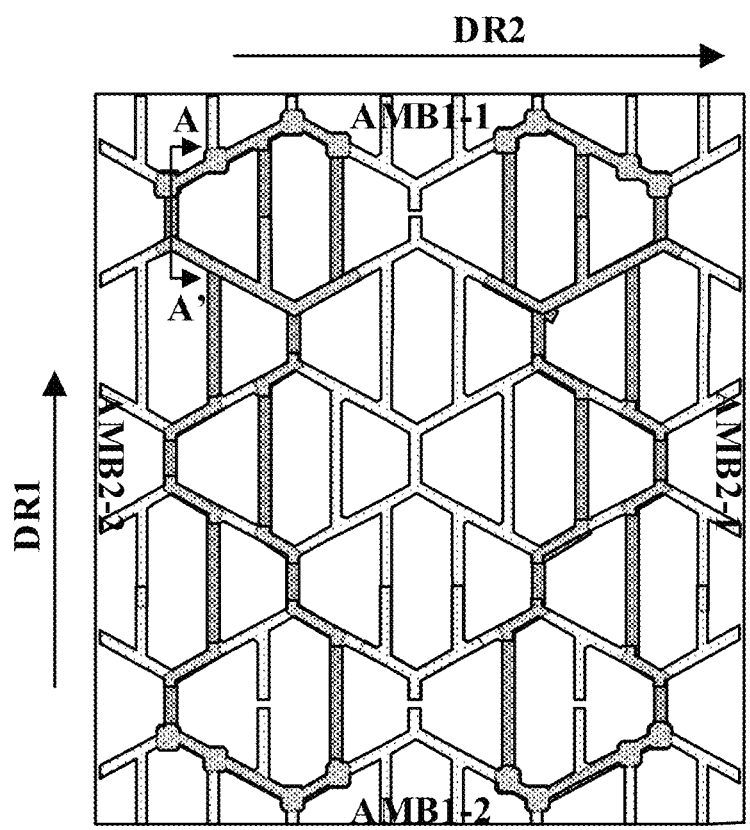
FIG. 7A illustrates the structure of an intersection in FIG. 6.
Figure 7B:
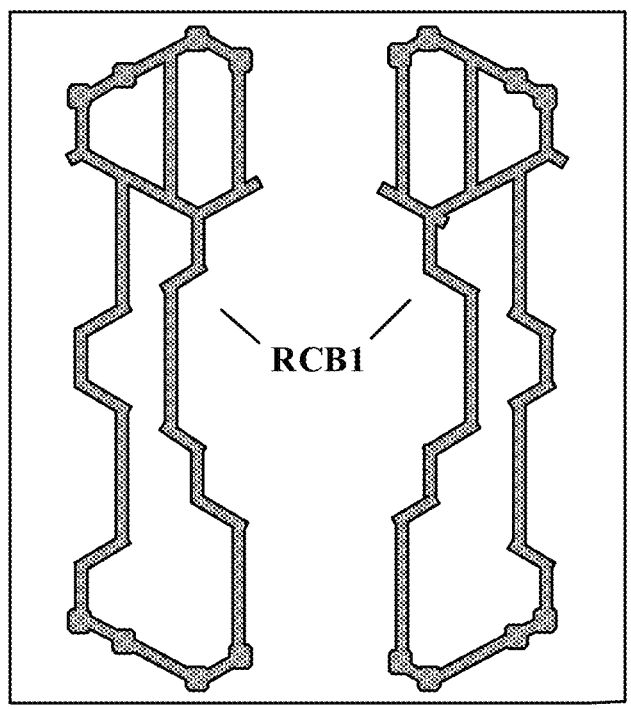
FIG. 7B illustrates the structure of a first mesh line layer in FIG. 7A.
Figure 7C:
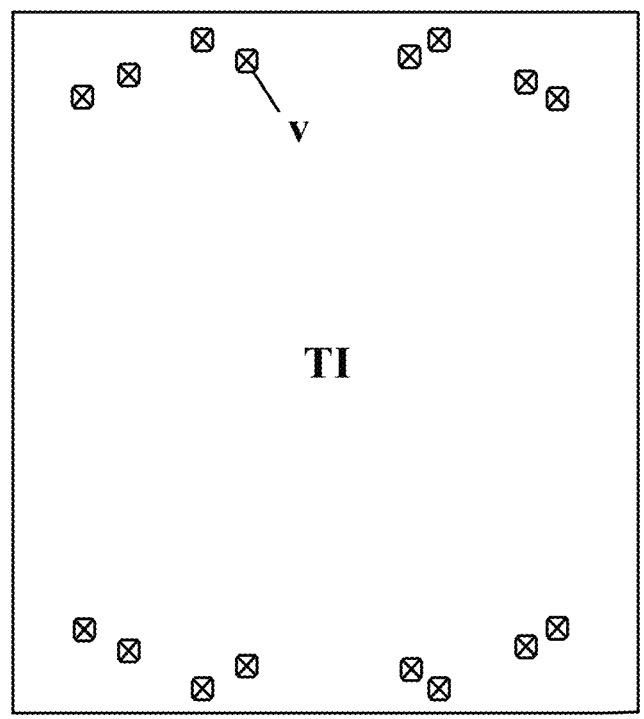
FIG. 7C illustrates the structure of a touch insulating layer in FIG. 7A.
Figure 7D:
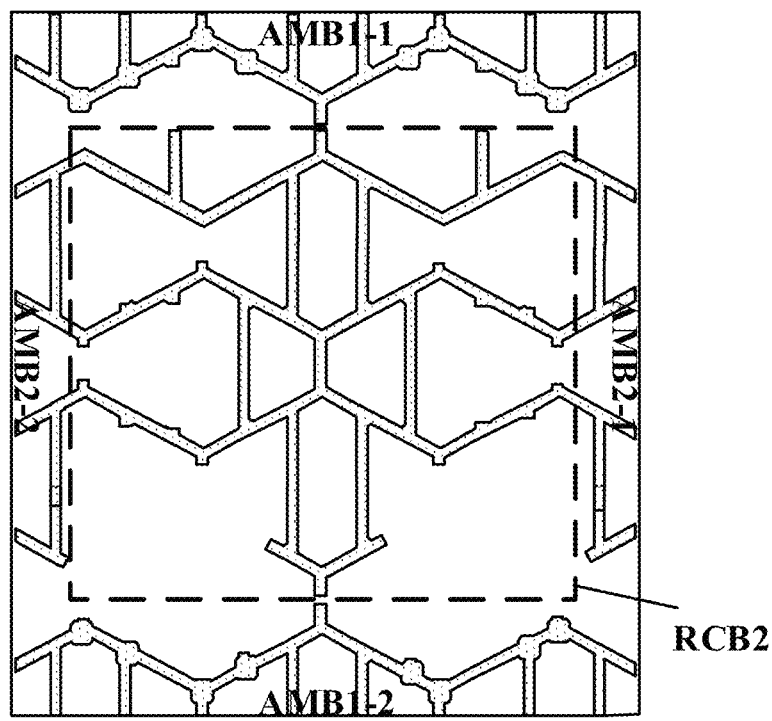
FIG. 7D illustrates the structure of a second mesh line layer in FIG. 7A.

FIG. 7A illustrates the structure of an intersection in FIG. 6. FIG. 7B illustrates the structure of a first mesh line layer in FIG. 7A. FIG. 7C illustrates the structure of a touch insulating layer in FIG. 7A. FIG. 7D illustrates the structure of a second mesh line layer in FIG. 7A. In some embodiments, two adjacent first mesh blocks of the plurality of first mesh blocks are electrically connected to each other through a respective first conductive bridge. FIG. 7B shows the structure of a respective first conductive bridge RCB1 in some embodiments according to the present disclosure. The respective first conductive bridge RCB1 includes two structures spaced apart from each other. Each structure includes a plurality of consecutive rings connected together. Each structure includes at least multiple mesh lines along the second direction DR2. FIG. 7C shows a plurality of vias v extending through the touch insulating layer TI. The second mesh line layer is connected to the respective first conductive bridge RCB1 through the plurality of vias v, respectively.

Referring to FIG. 7D, in the intersection, the second mesh line layer includes two adjacent first mesh blocks of the plurality of first mesh blocks and two adjacent second mesh blocks of the plurality of second mesh blocks. In one example, the two adjacent first mesh blocks includes a first adjacent first mesh block AMB1-1 and a second adjacent first mesh block AMB1-2; and the two adjacent second mesh blocks includes a first adjacent second mesh block AMB2-1 and a second adjacent second mesh block AMB2-2.

Figure 8:
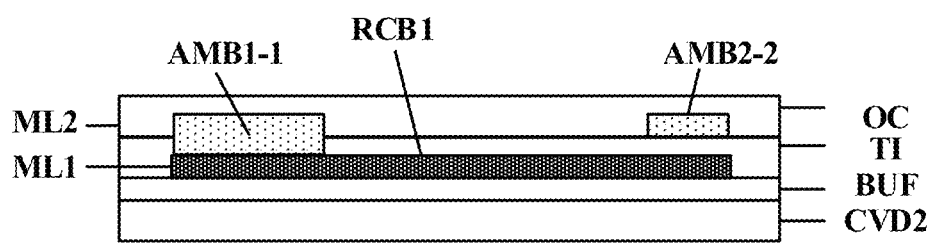
FIG. 8 is a cross-sectional view along an A-A' line in FIG. 7A.

FIG. 8 is a cross-sectional view along an A-A' line in FIG. 7A. Referring to FIG. 8, the touch control structure includes a second inorganic encapsulating sub-layer CVD2, a buffer layer BUF on the second inorganic encapsulating sub-layer CVD2, a first mesh line layer ML1 on a side of the buffer layer BUF away from the second inorganic encapsulating sub-layer CVD2, a touch insulating layer TI on a side of the first mesh line layer ML1 away from the buffer layer BUF, a second mesh line layer ML2 on a side of the touch insulating layer TI away from the first mesh line layer ML1, and an overcoat layer on a side of the second mesh line layer ML2 away from the touch insulating layer TI. As shown in FIG. 8, the first adjacent first mesh block AMB1-1 is connected to the respective first conductive bridge RCB1 through a via extending through the touch insulating layer TI.

Figure 9:
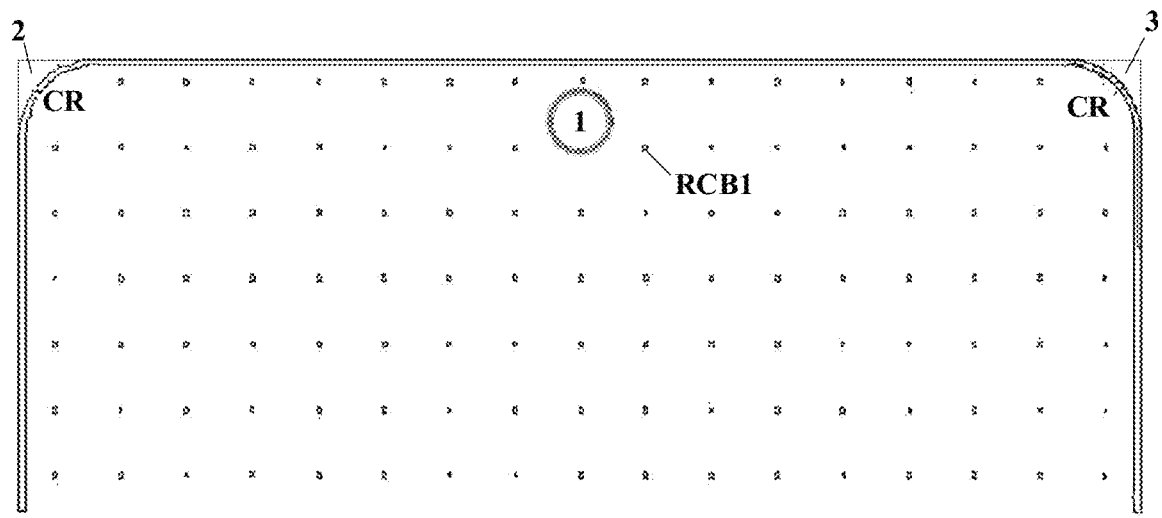
FIG. 9 illustrates possible truncated regions in a display panel having a touch control structure in some embodiments according to the present disclosure.

FIG. 9 illustrates possible truncated regions in a display panel having a touch control structure in some embodiments according to the present disclosure. FIG. 9 shows several examples of locations of truncated regions having the border mesh block. Referring to FIG. 9, regions 1, 2, and 3 are examples of possible truncated regions having one or more border mesh blocks. In one example, the truncated region is a window region (region 1) having a hole configured for installing an accessory such as a camera lens or a fingerprint sensor. The touch control structure is absent in the window region, which is at least partially surrounded by a touch control region. The touch control structure is limited in the touch control region and absent in the window region. In another example, in the window region, display elements of the display panel and the touch control structure are absent.

In another example, the truncated region is a region (region 2 or region 3) outside the touch control structure and adjacent to a corner region CR. The border mesh block is in a corner region CR of the touch control structure. In one example, the corner region CR is a corner region having at least a portion of an arc-shaped boundary, e.g., a round corner region.

Figure 10A:
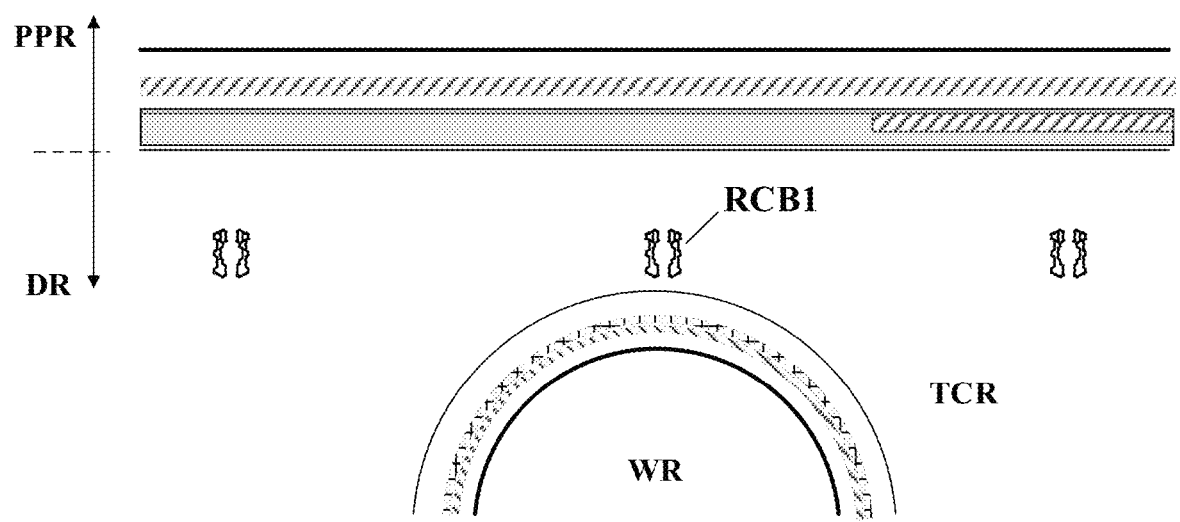
FIG. 10A shows a first conductive bridge adjacent to a window region in some embodiments according to the present disclosure.
Figure 10B:
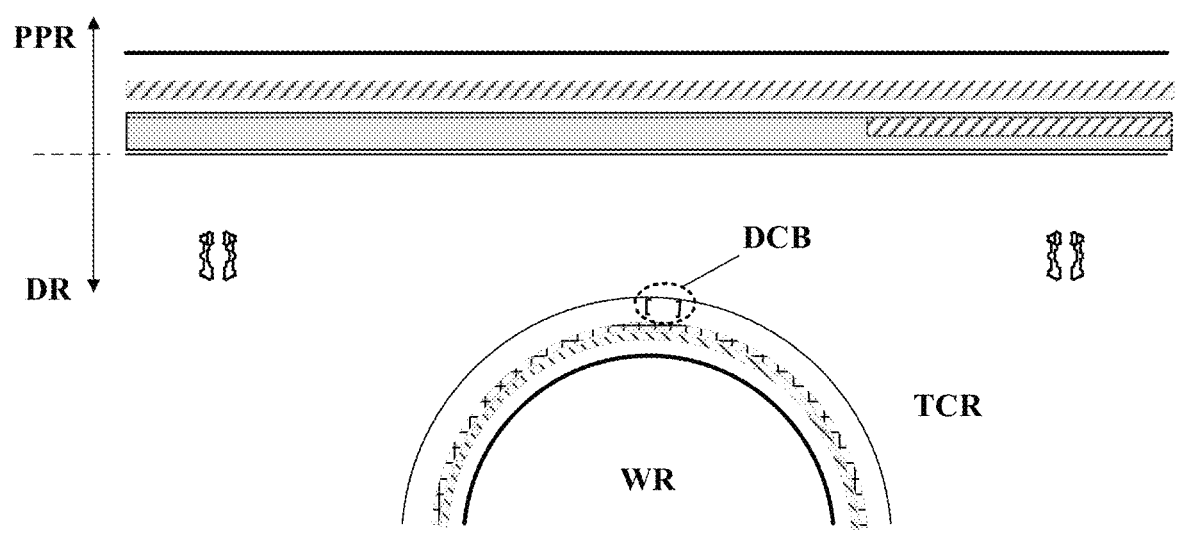
FIG. 10B shows a displaced conductive bridge adjacent to a window region in some embodiments according to the present disclosure.

FIG. 10A shows a first conductive bridge adjacent to a window region in some embodiments according to the present disclosure. FIG. 10B shows a displaced conductive bridge adjacent to a window region in some embodiments according to the present disclosure. Referring to FIG. 10A, the display panel having the touch control structure has a display region DR and a peripheral region PPR outside the display region PR. The display panel further has a window region WR in which the touch control structure is absent. The window region WR is at least partially surrounded by the touch control region TCR. In one example, the touch control region TCR substantially overlaps with the display region DR. As discussed above in connection with FIG. 2A, the touch control structure in some embodiments includes a plurality of first conductive bridges arranged in an array comprising a plurality of rows and a plurality of columns. A respective first conductive bridge is denoted as RCB1 in FIG. 10A.

As discussed above in connection with the FIG. 3A to FIG. 3D, because the respective first conductive bridge RCB1 is at a position adjacent to the window region WR, it is at least partially situated on a slope in a slope region. The respective first conductive bridge RCB1 is prone to line open during the fabrication process.

Referring to FIG. 10B, instead of forming the respective first conductive bridge RCB1 in the slope region, a displaced conductive bridge DCB for connecting adjacent first mesh blocks can be formed in a region having a much smaller slope or substantially no slope, as depicted in FIG. 10B. The displaced conductive bridge DCB is displaced from the array of the plurality of first conductive bridges from an array position to a non-array position. Referring to FIG. 10B, the displaced conductive bridge DCB is not in a same row as two adjacent first conductive bridges. The array position is where the touch control structure has a slope greater than an average slope of the touch control structure. The non-array position is where the touch control structure has a slope smaller than the slope of the touch control structure at the array position. For example, the displaced conductive bridge DCB in FIG. 10B is located at a bottom of the slope, thus the non-array position having the displaced conductive bridge DCB has a slope smaller than the slope of the touch control structure at the array position. In FIG. 10A, the respective first conductive bridge RCB1 is in a top or middle part of the slope, thus the array position having the respective first conductive bridge RCB1 has a slope greater than an average slope of the touch control structure due to presence of the truncated region, and greater than the slope of the touch control structure at the non-array position. By having the displaced conductive bridge DCB disposed in the non-array position, the displaced conductive bridge DCB is less prone to line break.

Moreover, as shown in FIG. 10B, the displaced conductive bridge DCB is even closer to the window region WR as compared to the respective first conductive bridge RCB1 in FIG. 10A. Accordingly, the displaced conductive bridge DCB is outside of the display region DR, whereas the respective first conductive bridge RCB1 in FIG. 10A is inside the display region DR. Without the need to form subpixels outside the display region DR, more space is available for forming mesh lines. A line width of the displaced conductive bridge DCB can be greater than a line width of mesh lines in the display region DR. In one example, the line width of mesh lines in the display region DR is in a range of 1 μm to 5 μm, e.g., 1.0 μm to 2.0 μm, 2.0 μm to 3.0 μm, 3.0 μm to 4.0 μm, or 4.0 μm to 5.0 μm. Optionally, the line width of mesh lines in the display region DR is 3.0 μm. Optionally, the line width of mesh lines in the display region DR is 3.5 μm. Optionally, the line width of the displaced conductive bridge DCB is greater than 5 μm, e.g., 5 μm to 6 μm, 6 μm to 8 μm, 8 μm to 10 μm, 10 μm to 12 μm, 12 μm to 14 μm, 14 μm to 16 μm, 16 μm to 18 μm, or 18 μm to 20 μm. Optionally, the line width of the displaced conductive bridge DCB is greater than 10 μm.

Figure 11:
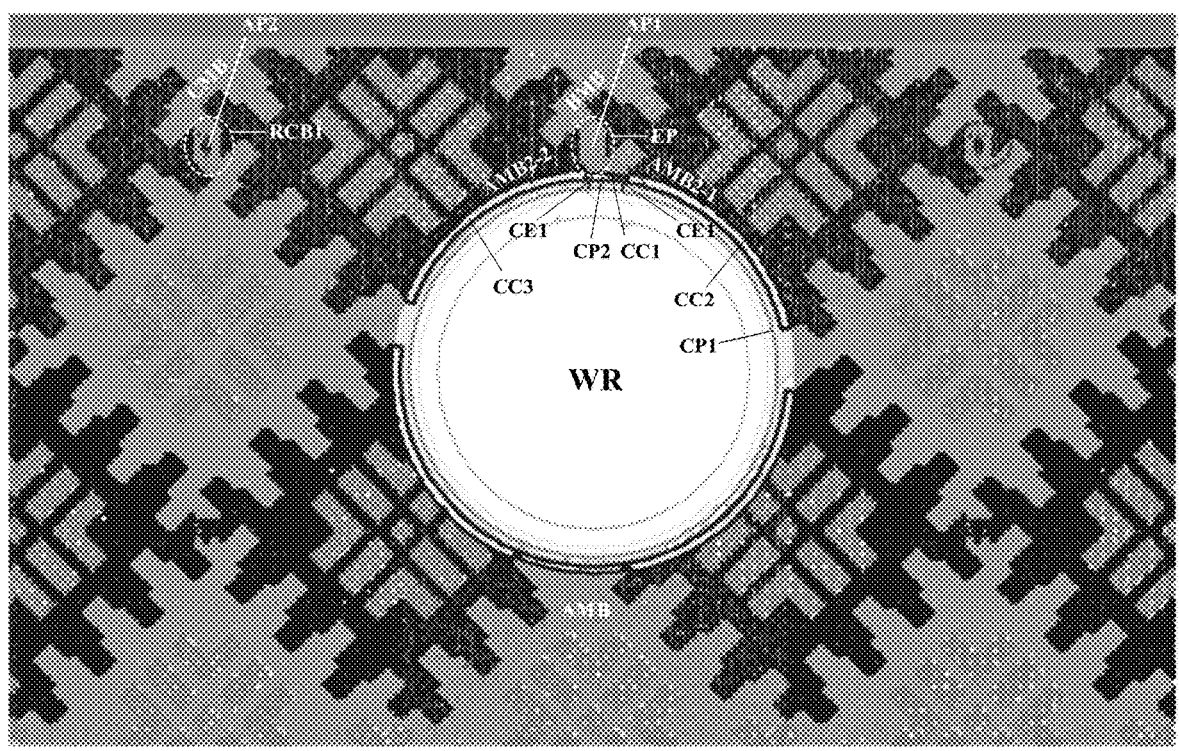
FIG. 11 illustrates a touch control structure in some embodiments according to the present disclosure.

FIG. 11 illustrates a touch control structure in some embodiments according to the present disclosure. Referring to FIG. 11, the touch control structure includes a border mesh block BMB adjacent to a window region WR in which the touch control structure is absent. The border mesh block BMB is electrically connected to a mesh block AMB of the plurality of first mesh electrodes, the mesh block AMB is on a different side (e.g., on an opposite side) of the window region WR from the border mesh block BMB. The border mesh block BMB spaces apart two adjacent second mesh blocks of the plurality of second mesh blocks, e.g., a first adjacent second mesh block AMB2-1 and a second adjacent second mesh block AMB2-2. The first adjacent second mesh block AMB2-1, the border mesh block BMB, and the second adjacent second mesh block AMB2-2 sequentially surround portions of a perimeter of the window region WR.

In some embodiments, the border mesh block BMB has a structure different from at least one first mesh block (e.g., a mesh block CMB in FIG. 11) of the plurality of first mesh blocks in that the border mesh block includes an extended portion EP at a first array position AP1 whereas the mesh block CMB does not have an extended portion. Instead, in a second array position AP2 corresponding to the mesh block CMB, the touch control structure includes a respective first conductive bridge RCB1. Mesh lines of the extended portion EP at least partially extends over the first array position AP1. The respective first conductive bridge RCB1 is in a first mesh line layer, whereas the extended portion EP is in a second mesh line layer. The mesh lines of the extended portion EP are in a same layer as mesh lines of the border mesh block BMB outside of the extended portion EP. In one example, the extended portion EP, the mesh lines of the border mesh block BMB outside of the extended portion EP, the plurality of first mesh blocks, and the plurality of second mesh blocks are in the second mesh line layer, whereas the plurality of first conductive bridge are in the first mesh line layer.

As used herein, the term "same layer" refers to the relationship between the layers simultaneously formed in the same step. In one example, the mesh lines of the extended portion EP and the mesh lines of the border mesh block BMB outside of the extended portion EP are in a same layer when they are formed as a result of one or more steps of a same patterning process performed in a material deposited in a same deposition process. In another example, the mesh lines of the extended portion EP and the mesh lines of the border mesh block BMB outside of the extended portion EP can be formed in a same layer by simultaneously performing the step of forming the mesh lines of the extended portion EP, and the step of forming the mesh lines of the border mesh block BMB outside of the extended portion EP. The term "same layer" does not always mean that the thickness of the layer or the height of the layer in a cross-sectional view is the same.

In some embodiments, the extended portion EP and the plurality of first conductive bridges are in a same array comprising rows and columns; and the extended portion EP and the plurality of first conductive bridges are at the plurality of array positions, respectively. However, the extended portion EP is in a different layer from the plurality of first conductive bridges.

In some embodiments, the border mesh block BMB has an area smaller than (by 5%, by 10%, by 20%, by 30%, by 40%, by 50%, by 60%, by 70%, by 80%, by 90%, or by 95% or more) each of the plurality of first mesh blocks, due to presence of the truncated region.

Figure 12:
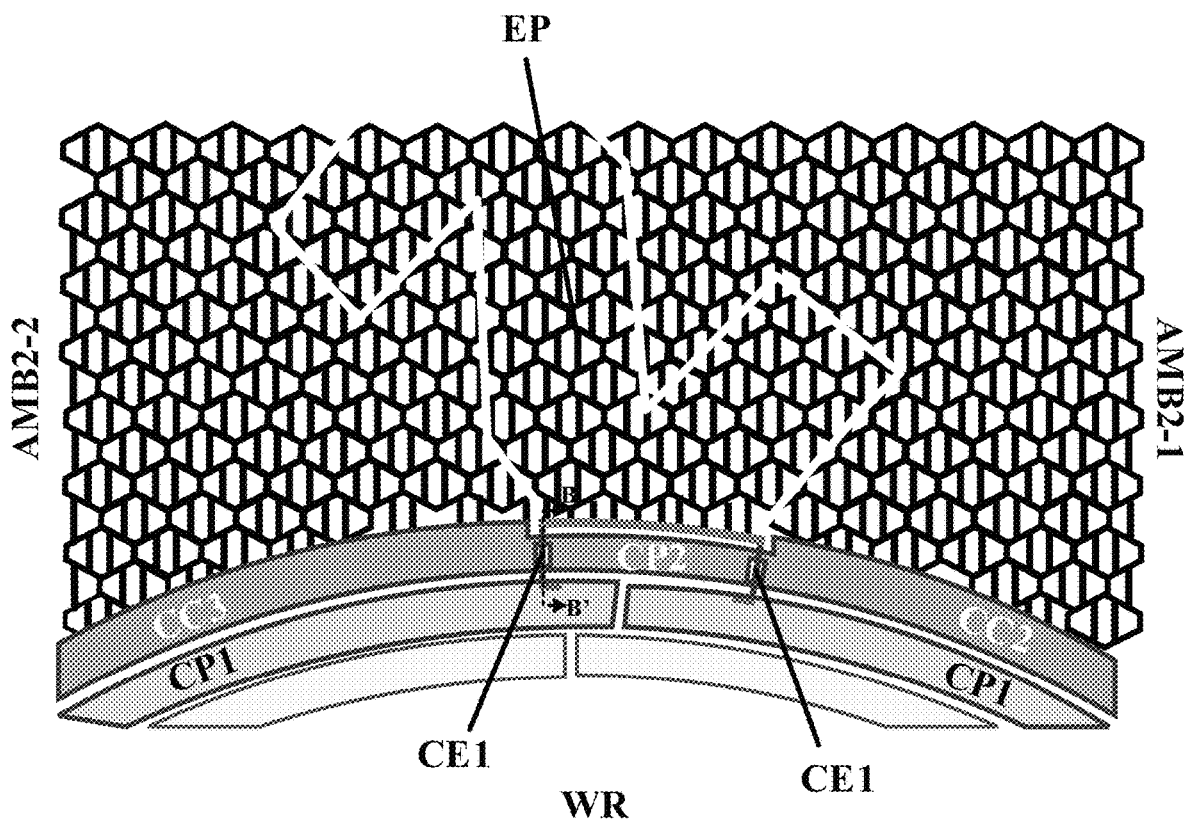
FIG. 12 is a zoom-in view of a region surrounding an extended portion of a border mesh block in a touch control structure in some embodiments according to the present disclosure.

FIG. 12 is a zoom-in view of a region surrounding an extended portion of a border mesh block in a touch control structure in some embodiments according to the present disclosure. Referring to FIG. 11 and FIG. 12, in some embodiments, the displaced conductive bridge DCB includes one or more first conductive extensions CE1 electrically connected to the extended portion EP, the one or more first conductive extensions CE1 extending away from the extended portion EP toward the window region WR; and one or more first conductive plates CP1 connected to the one or more first conductive extensions CE1, the one or more first conductive plates CP1 at least partially surrounding the window region WR. The one or more first conductive plates CP1 are electrically connected to a mesh block AMB of the plurality of first mesh electrodes. The mesh block AMB is on a different side of the window region WR from the border mesh block BMB.

Figure 13:
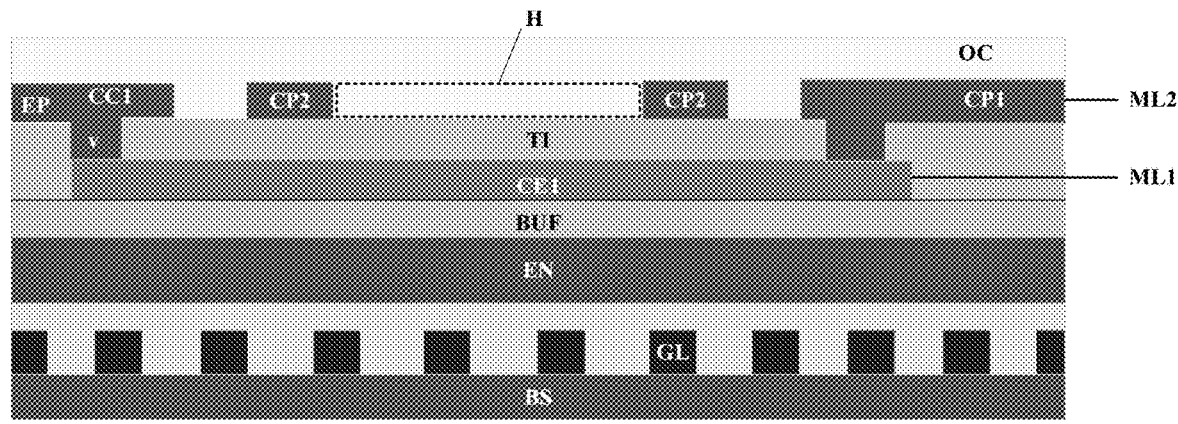
FIG. 13 is a cross-sectional view along a B-B' line in FIG. 12.

FIG. 13 is a cross-sectional view along a B-B' line in FIG. 12. Referring to FIG. 13, the touch control structure includes a base substate BS; a plurality of signal lines (e.g., gate lines GL) on the base substrate BS; an encapsulating layer EN on a side of the plurality of signal lines away from the base substrate BS, encapsulating the plurality of signal lines; a buffer layer BUF on a side of the encapsulating layer EN away from the base substrate BS; a first mesh line layer ML1 on a side of the buffer layer BUF away from the encapsulating layer EN; a touch insulating layer TI on a side of the first mesh line layer ML1 away from the buffer layer BUF, a second mesh line layer ML2 on a side of the touch insulating layer TI away from the first mesh line layer ML1, and an overcoat layer on a side of the second mesh line layer ML2 away from the touch insulating layer TI. As shown in FIG. 13, the one or more first conductive extensions CE1 is in the first mesh line layer ML1; the extended portion EP and the one or more first conductive plates CP1 are in the second mesh line layer ML2. Optionally, the one or more first conductive extensions CE1 is in the first mesh line layer ML1; the one or more first conductive plates CP1, the border mesh block, the mesh block, mesh blocks of the plurality of first mesh electrodes, and mesh blocks of the plurality of second mesh electrodes are in a second mesh line layer ML2. The touch insulating layer TI is between the first mesh line layer ML1 and the second mesh line layer ML2.

Referring to FIG. 11 to FIG. 13, the displaced conductive bridge in some embodiments further includes a first capacitance compensating conductive plate CC1 along an edge of the extended portion EP adjacent to the window region WR. The first capacitance compensating conductive plate CC1 is directly connected to at least one mesh line of the extended portion EP, and is connected to the one or more first conductive extensions CE1 through a via v extending through a touch insulating layer TI. Optionally, the one or more first conductive extensions CE1 is in the first mesh line layer ML1; the one or more first conductive plates CP1, the first capacitance compensating conductive plate CC1, the border mesh block, the mesh block, mesh blocks of the plurality of first mesh electrodes, and mesh blocks of the plurality of second mesh electrodes are in a second mesh line layer ML2.

In some embodiments, the border mesh block BMB spaces apart two adjacent second mesh blocks of a plurality of second mesh blocks of a respective one of the plurality of second mesh electrodes. A first adjacent second mesh block AMB2-1 of the two adjacent second mesh blocks, the border mesh block BMB, and a second adjacent second mesh block AMB2-2 of the two adjacent second mesh blocks sequentially surround portions of a perimeter of the window region WR. In some embodiments, the respective one of the plurality of second mesh electrodes includes a second capacitance compensating conductive plate CC2, a second conductive plate CP2, and a third capacitance compensating conductive plate CC3 sequentially connected. Optionally, the second capacitance compensating conductive plate CC2, the second conductive plate CP2, and the third capacitance compensating conductive plate CC3 are parts of a unitary structure. Optionally, the second capacitance compensating conductive plate CC2, the second conductive plate CP2, and the third capacitance compensating conductive plate CC3 are in a same layer. In some embodiments, the one or more first conductive extensions CE1 are in a first mesh line layer ML1; the second capacitance compensating conductive plate CC2, the second conductive plate CP2, and the third capacitance compensating conductive plate CC3 are in a second mesh line layer ML2.

In some embodiments, the second capacitance compensating conductive plate CC2 is directly connected to at least one mesh line of the first adjacent second mesh block AMB2-1; the third capacitance compensating conductive plate CC3 is directly connected to at least one mesh line of the second adjacent second mesh block AMB2-2; and the second conductive plate CP2 connects the second capacitance compensating conductive plate CC2 with the third capacitance compensating conductive plate CC3.

Figure 14:
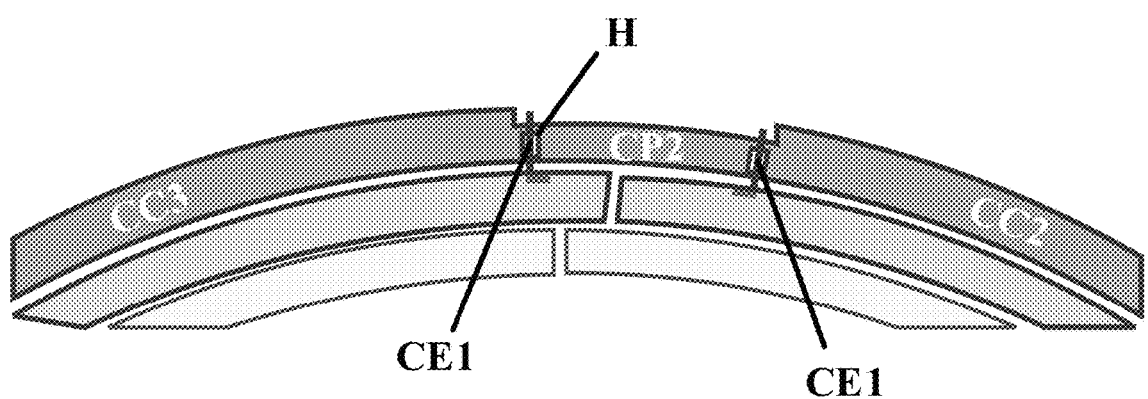
FIG. 14 illustrates the structure of a second conductive plate and one or more first conductive extensions in a touch control structure in some embodiments according to the present disclosure.

In some embodiments, the one or more first conductive extensions CE1 cross over the second conductive plate CP2, e.g., an orthographic projection of the one or more first conductive extensions CE1 on a base substrate partially overlaps with an orthographic projection of the second conductive plate CP2 on the base substrate. FIG. 14 illustrates the structure of a second conductive plate and one or more first conductive extensions in a touch control structure in some embodiments according to the present disclosure. In some embodiments, referring to FIG. 13 and FIG. 14, the touch control structure includes a hole H extending through the second conductive plate CP2, and a respective one of the one or more first conductive extensions CE1 crosses over the hole H, as shown in FIG. 13 and FIG. 14. The hole H spaces apart the second conductive plate CP2 and an adjacent capacitance compensating conductive plate (e.g., the second capacitance compensating conductive plate CC2 or the third capacitance compensating conductive plate CC3).

Figure 15:
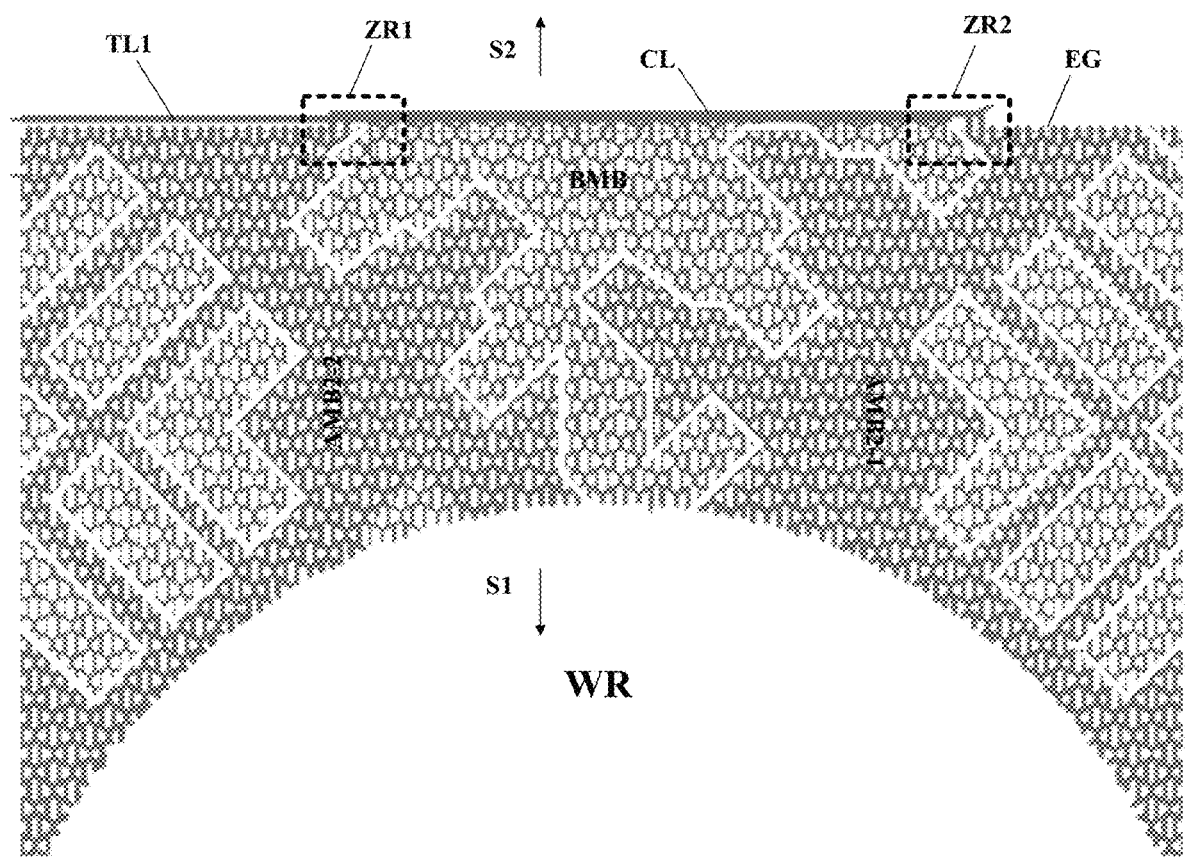
FIG. 15 illustrate a border mesh block BMB that is adjacent to an edge of the touch control structure in some embodiments according to the present disclosure.
Figure 16:
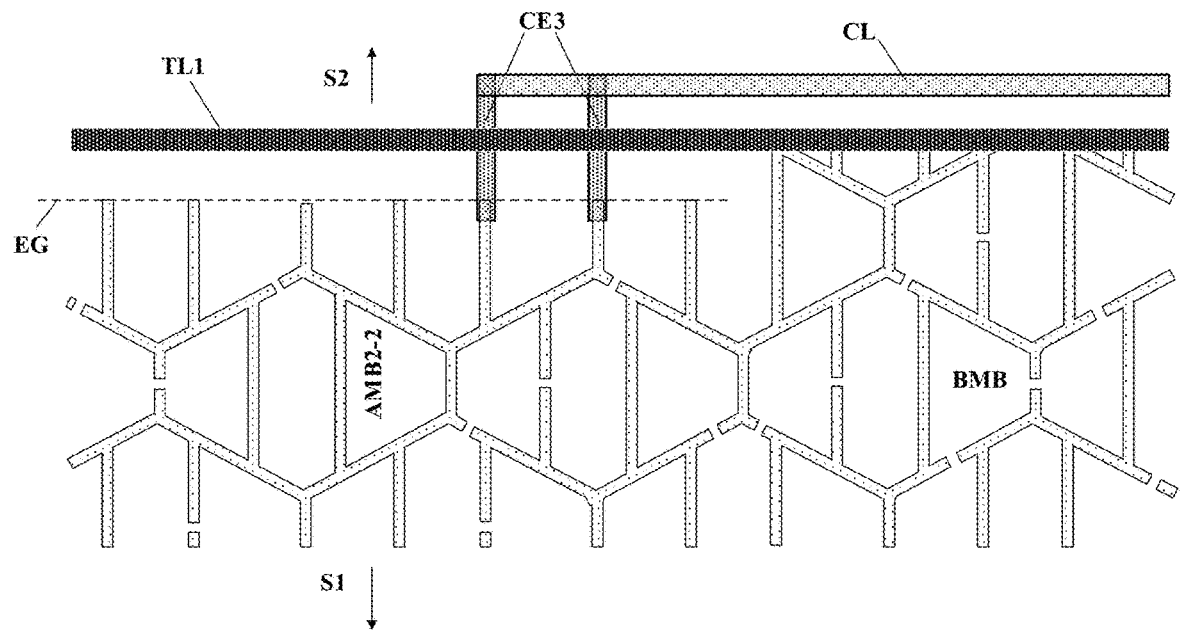
FIG. 16 is a zoom-in view of a first zoom-in region ZR1 in FIG. 15.
Figure 17:
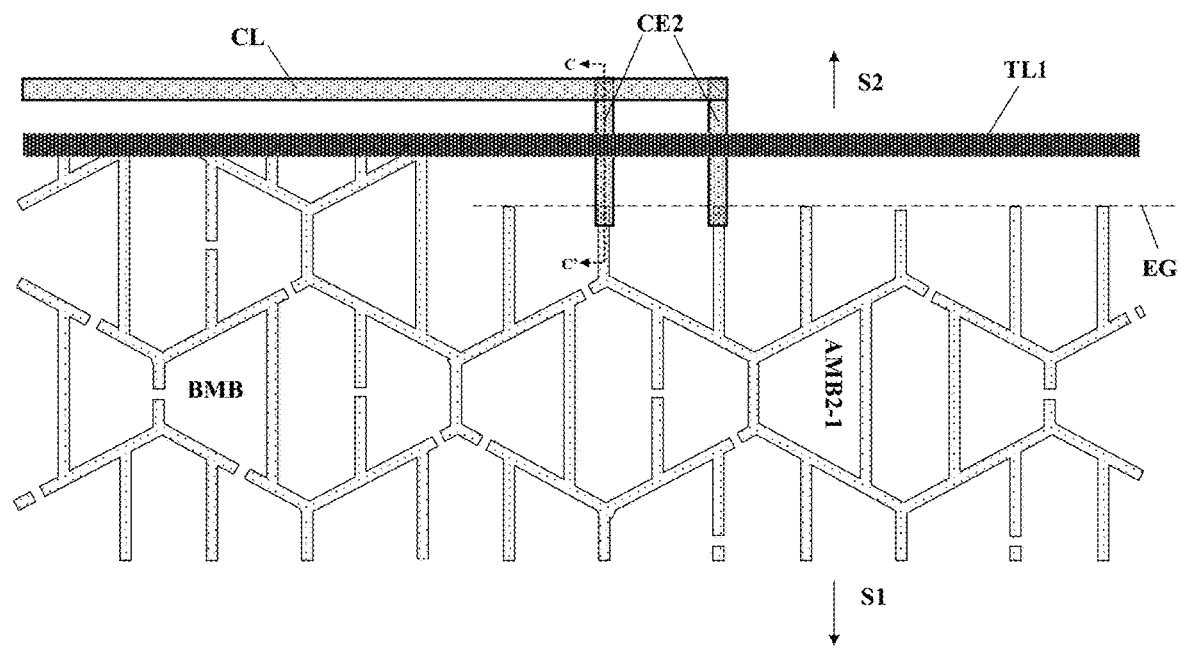
FIG. 17 is a zoom-in view of a second zoom-in region ZR2 in FIG. 15.

In some embodiments, the displaced conductive bridge DCB is displaced from an array position to a non-array position adjacent to an edge of the touch control structure. FIG. 15 illustrate a border mesh block BMB that is adjacent to an edge of the touch control structure in some embodiments according to the present disclosure. FIG. 16 is a zoom-in view of a first zoom-in region ZR1 in FIG. 15. FIG. 17 is a zoom-in view of a second zoom-in region ZR2 in FIG. 15. Referring to FIG. 15 to FIG. 17, on a first side S1, the first adjacent second mesh block AMB2-1, the border mesh block BMB, and the second adjacent second mesh block AMB2-2 are adjacent to the window region WR. On a second side S2, the first adjacent second mesh block AMB2-1, the border mesh block BMB, and the second adjacent second mesh block AMB2-2 are along an edge EG of the touch control structure. By having the displaced conductive bridge DCB disposed in the non-array position along the edge EG, the displaced conductive bridge DCB is less prone to line break.

In some embodiments, the touch control structure further includes a first trace line TL1 electrically connecting the border mesh block BMB along the edge EG on the second side S2 to a touch control integrated circuit on the first side S1. The first trace line TL1 is electrically connected to at least one mesh line of the border mesh block BMB. Optionally, the first trace line TL1 is along the edge EG of the touch control structure. Optionally, the first trace line TL1 is directly connected to at least one mesh line of the border mesh block BMB. The first trace line TL1 extends in a peripheral region of the display panel having the touch control structure, and is limited in the peripheral region.

In some embodiments, the touch control structure further includes one or more second conductive extensions CE2 electrically connected to the first adjacent second mesh block AMB2-1. The one or more second conductive extensions CE2 extend away from the first adjacent second mesh block AMB2-1 away from the window region WR.

In some embodiments, the touch control structure further includes one or more third conductive extensions CE3 electrically connected to the second adjacent second mesh block AMB2-2. The one or more third conductive extensions CE3 extend away from the second adjacent second mesh block AMB2-2 away from the window region WR.

In some embodiments, the touch control structure further includes a connecting line CL connecting the one or more second conductive extensions CE2 with the one or more third conductive extensions CE3.

In some embodiments, the one or more second conductive extensions CE2, the connecting line CL, and the one or more third conductive extensions CE3 are in a same layer; the connecting line CL is in direct contact with the one or more second conductive extensions CE2; and the connecting line CL is in direct contact with the one or more third conductive extensions CE3. In one example, the one or more second conductive extensions CE2, the connecting line CL, and the one or more third conductive extensions CE3 are parts of a unitary structure in a first mesh line layer. The first trace line, the first adjacent second mesh block, the border mesh block, and the second adjacent second mesh block are in a second mesh line layer.

Figure 18:
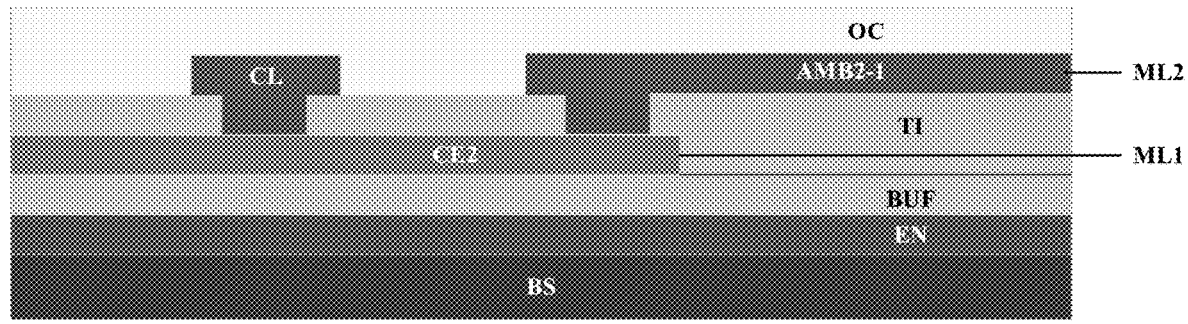
FIG. 18 is a cross-sectional view along a C-C' line in FIG. 17.

FIG. 18 is a cross-sectional view along a C-C' line in FIG. 17. Referring to FIG. 15 to FIG. 18, in some embodiments, the one or more second conductive extensions CE2 and the one or more third conductive extensions CE3 are in a first mesh line layer ML1; and the first trace line TL1, the connecting line CL, the first adjacent second mesh block AMB2-1, the border mesh block BMB, and the second adjacent second mesh block AMB2-2 are in a second mesh line layer ML2. The connecting line CL is connected to the one or more second conductive extensions CE2 and the one or more third conductive extensions CE3 through vias extending through the touch insulating layer TI. The first adjacent second mesh block AMB2-1 is connected to the one or more second conductive extensions CE2 through one or more vias extending through the touch insulating layer TI. The second adjacent second mesh block AMB2-2 is connected to the one or more third conductive extensions CE3 through one or more vias extending through the touch insulating layer TI.

Figure 19:
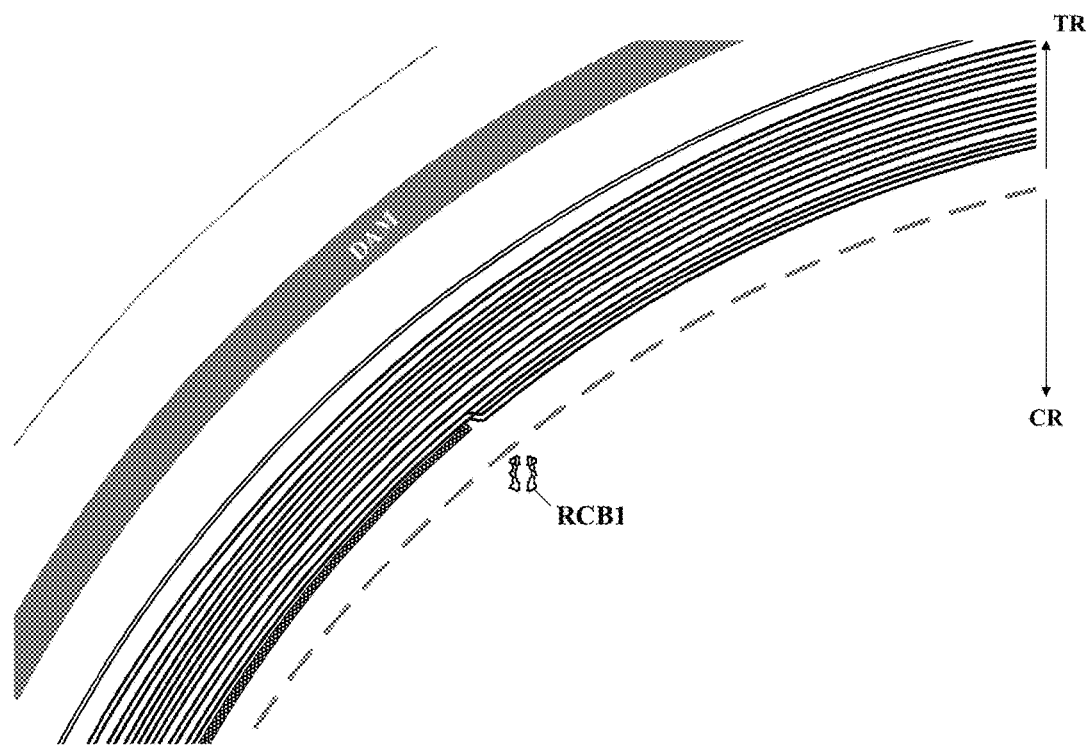
FIG. 19 shows a displaced conductive bridge adjacent to a truncated region in some embodiments according to the present disclosure.

FIG. 19 shows a displaced conductive bridge adjacent to a truncated region in some embodiments according to the present disclosure. Referring to FIG. 19, the border mesh block in some embodiments is in a corner region CR of the touch control structure. The truncated region TR is a region outside the touch control structure and adjacent to the corner region CR. In one example, the corner region CR is a round corner region. A respective first conductive bridge RCB1 connected to the border mesh block may be at an array position that is adjacent to the truncated region TR. As shown in FIG. 19, the respective first conductive bridge RCB1 is in close proximity to a dam structure DAM of the display panel having the touch control structure. The presence of the dam structure DAM results in a slope region or otherwise uneven layer structure in the corner region CR. In one example, mesh lines of the respective first conductive bridge RCB1 are prone to line break when it is located within a threshold distance to the dam structure DAM. Optionally, the threshold distance is less than 3.0 mm, e.g., 2.5 mm, 2.0 mm, 1.5 mm, 1.0 mm, or 0.5 mm. To obviate the line break issue, the respective first conductive bridge RCB1 may be displaced from the array position to a non-array position.

Figure 20:
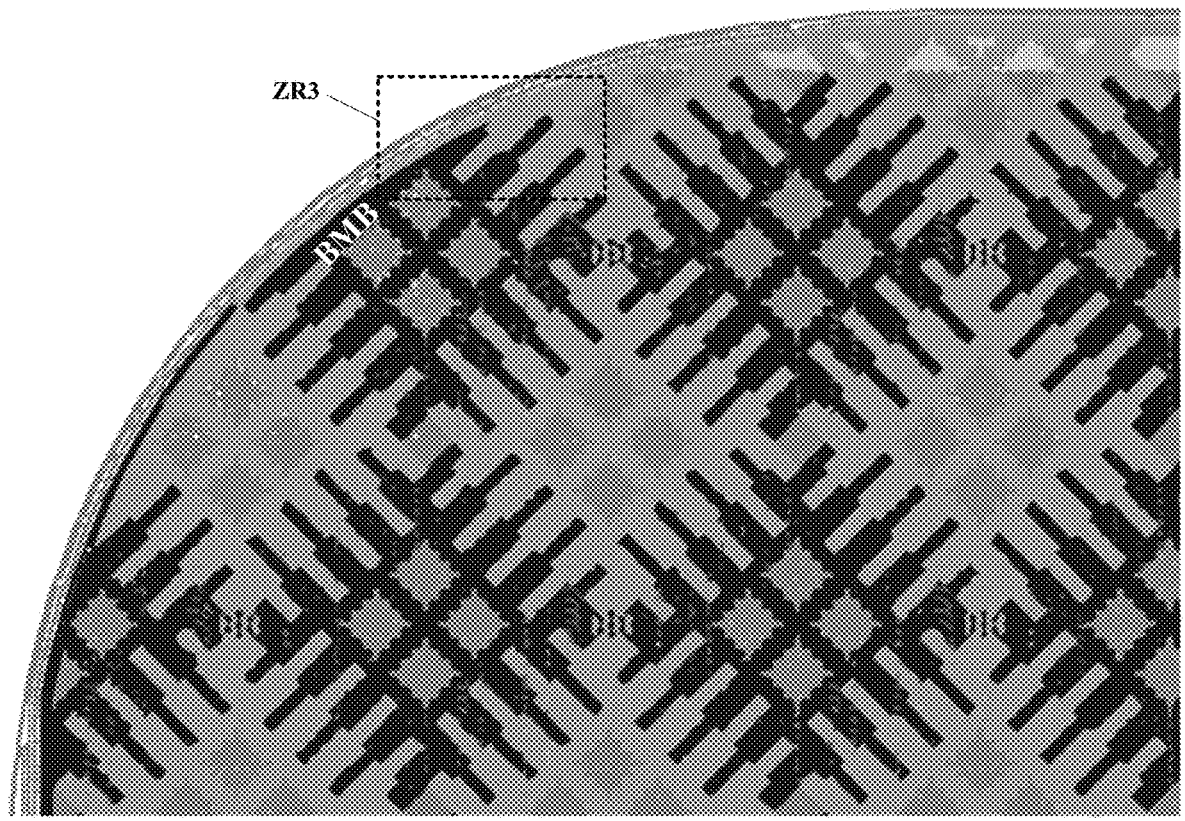
FIG. 20 shows a displaced conductive bridge adjacent to a corner region in some embodiments according to the present disclosure.
Figure 21:
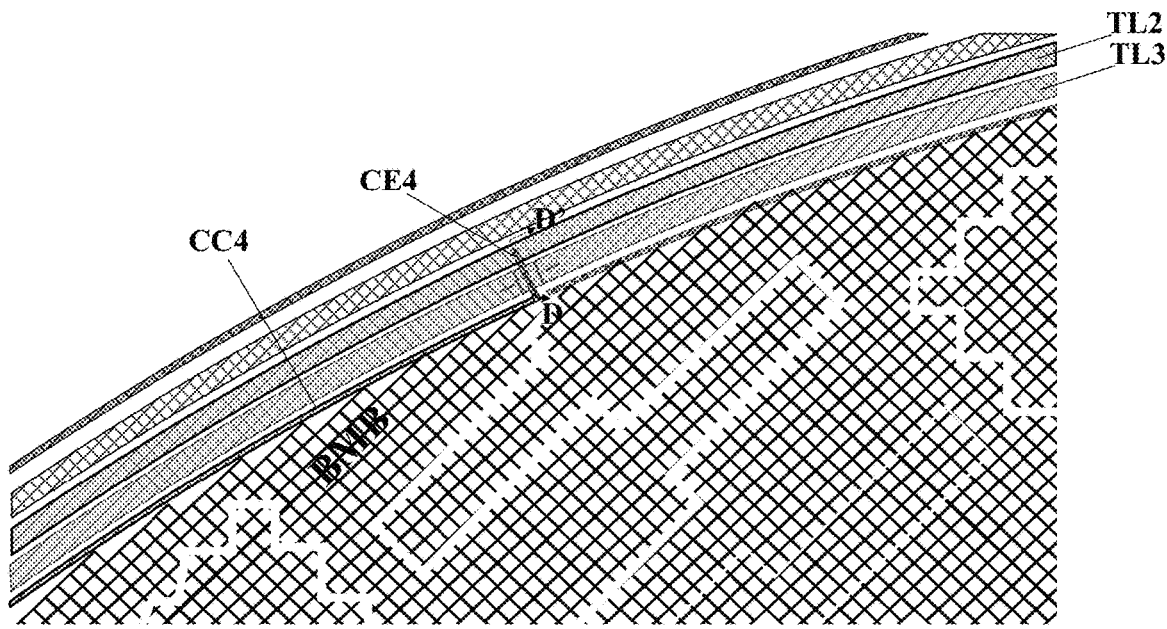
FIG. 21 is a zoom-in view of a third zoom-in region ZR3 in FIG. 20.
Figure 22:
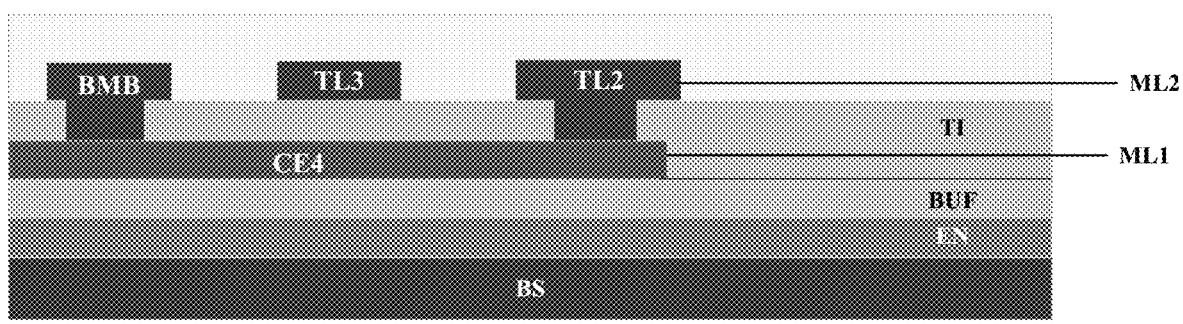
FIG. 22 is a cross-sectional view along a D-D' line in FIG. 21.

FIG. 20 shows a displaced conductive bridge adjacent to a corner region in some embodiments according to the present disclosure. FIG. 21 is a zoom-in view of a third zoom-in region ZR3 in FIG. 20. FIG. 22 is a cross-sectional view along a D-D' line in FIG. 21. Referring to FIG. 20 to FIG. 22, the displaced conductive bridge in some embodiments includes one or more fourth conductive extensions CE4 electrically connected to the border mesh block BMB. The one or more fourth conductive extensions CE4 extend away from the border mesh block BMB toward the region outside the touch control structure. Optionally, the one or more fourth conductive extensions CE4 are electrically connected to a second trace line TL2. The second trace line TL2 is electrically connected to a touch control integrated circuit configured to provide touch scanning signals to the mesh electrodes and/or receive touch sensing signals from the mesh electrodes. The second trace line TL2 extends in a peripheral region of the display panel having the touch control structure, and is limited in the peripheral region.

In some embodiments, the displaced conductive bridge further includes a fourth capacitance compensating conductive plate CC4 directly connected to at least one mesh line of the border mesh block BMB. Optionally, the fourth capacitance compensating conductive plate CC4 is electrically connected to the one or more fourth conductive extensions CE4 through one or more vias extending through the touch insulating layer TI.

In some embodiments, the one or more fourth conductive extensions CE4 are in a first mesh line layer ML1; the border mesh block BMB, the fourth capacitance compensating conductive plate CC4, and the second trace line TL2 are in a second mesh line layer ML2.

In some embodiments, the touch control structure further includes a third trace line TL3 electrically connected to a mesh block of the plurality of second mesh electrodes. The third trace line TL3 is electrically connected to a touch control integrated circuit. Optionally, the third trace line TL3 is between the second trace line TL2 and the border mesh block BMB. In one example, the one or more fourth conductive extensions CE4 cross over the third trace line TL3.

The capacitance compensating conductive plate (e.g., each of the first capacitance compensating conductive plate CC1, the second capacitance compensating conductive plate CC2, and the third capacitance compensating conductive plate CC3) may be implemented with various appropriate forms of structures. In some embodiments, the capacitance compensating conductive plate has a single layer structure, which is optionally in a same layer as mesh lines of mesh blocks of the plurality of first mesh electrodes and the plurality of second mesh electrodes.

Figure 23A:
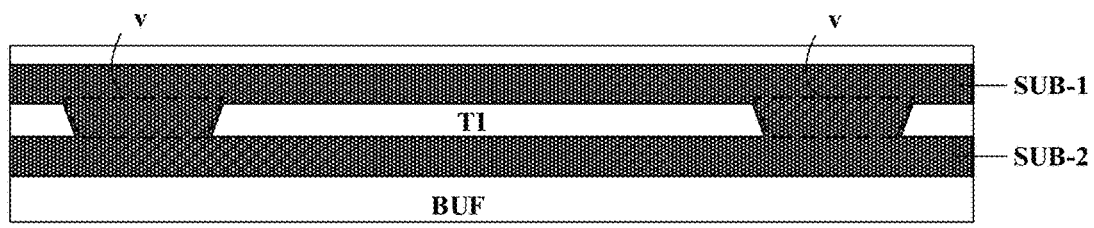
FIG. 23A is a schematic diagram illustrating the structure of a capacitance compensating conductive plate in some embodiments according to the present disclosure.
Figure 23B:
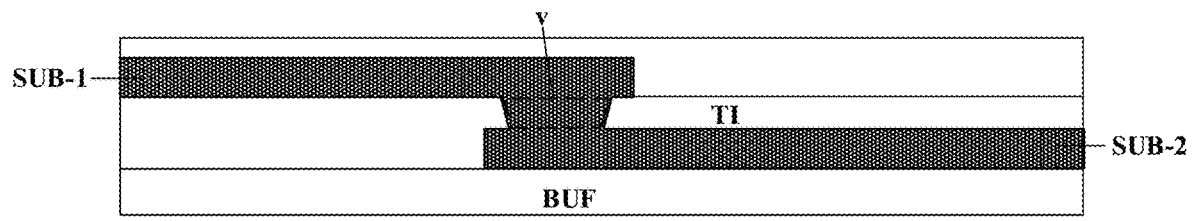
FIG. 23B is a schematic diagram illustrating the structure of a capacitance compensating conductive plate in some embodiments according to the present disclosure.

In some embodiment, the capacitance compensating conductive plate has a double sub-layer structure, including a first sub-layer in a same layer as the mesh lines of mesh blocks of the plurality of first mesh electrodes and the plurality of second mesh electrodes, and a second sub-layer in a same layer as the conductive bridge (e.g., the plurality of first conductive bridges and the displaced conductive bridge). FIG. 23A is a schematic diagram illustrating the structure of a capacitance compensating conductive plate in some embodiments according to the present disclosure. FIG. 23B is a schematic diagram illustrating the structure of a capacitance compensating conductive plate in some embodiments according to the present disclosure. Referring to FIG. 23A and FIG. 23B, the double sub-layer structure includes a first sub-layer SUB-1 and a second sub-layer SUB-2. The first sub-layer SUB-1 is connected to the second sub-layer SUB-2 through a via v extending through the touch insulating layer TI. In FIG. 23A, orthographic projections of the first sub-layer SUB-1 and the second sub-layer SUB-2 on the touch insulating layer TI at least partially overlaps with each other throughout an entire length of the capacitance compensating conductive plate. In FIG. 23B, the first sub-layer SUB-1 and the second sub-layer SUB-2 alternate with each other. Orthographic projections of the first sub-layer SUB-1 and the second sub-layer SUB-2 on the touch insulating layer TI are substantially non-overlapping with each other except for around a position where the first sub-layer SUB-1 connects with the second sub-layer SUB-2 through the via v.

Optionally, the conductive plate (e.g., any of the first conductive plate CP1, the second conductive plate CP2, the first capacitance compensating conductive plate CC1, the second capacitance compensating conductive plate CC2, and the third capacitance compensating conductive plate CC3) has a line width greater than a line width of the mesh lines of the plurality of first mesh blocks and the plurality of second mesh blocks. Optionally, the line width of the conductive plate is in a range of 5 μm to 50 μm, e.g., 5 μm to 10 μm, 10 μm to 15 μm, 15 μm to 20 μm, 20 μm to 25 μm, 25 μm to 30 μm, 30 μm to 35 μm, 35 μm to 40 μm, 40 μm to 45 μm, or 45 μm to 50 μm. Optionally, the line width of the conductive plate is 20 μm. Optionally, the mesh lines of the plurality of first mesh blocks and the plurality of second mesh blocks have a line width in a range of 1 μm to 5 μm, e.g., 1 μm to 2 μm, 2 μm to 3 μm, 3 μm to 4 μm, or 4 μm to 5 μm. Optionally, the mesh lines of the plurality of first mesh blocks and the plurality of second mesh blocks have a line width of 3 μm. Optionally, a ratio between the line width of the conductive plate and the line width of the mesh lines of the plurality of first mesh blocks and the plurality of second mesh blocks is in a range 1:1 to 50:1, e.g., 1:1 to 2:1, 2:1 to 3:1, 3:1 to 4:1, 4:1 to 5:1, 5:1 to 10:1, 10:1 to 20:1, 20:1 to 30:1, 30:1 to 40:1, or 40:1 to 50:1.

In another aspect, the present disclosure provides a display apparatus including a display panel and a touch control structure described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

Figure 24A:
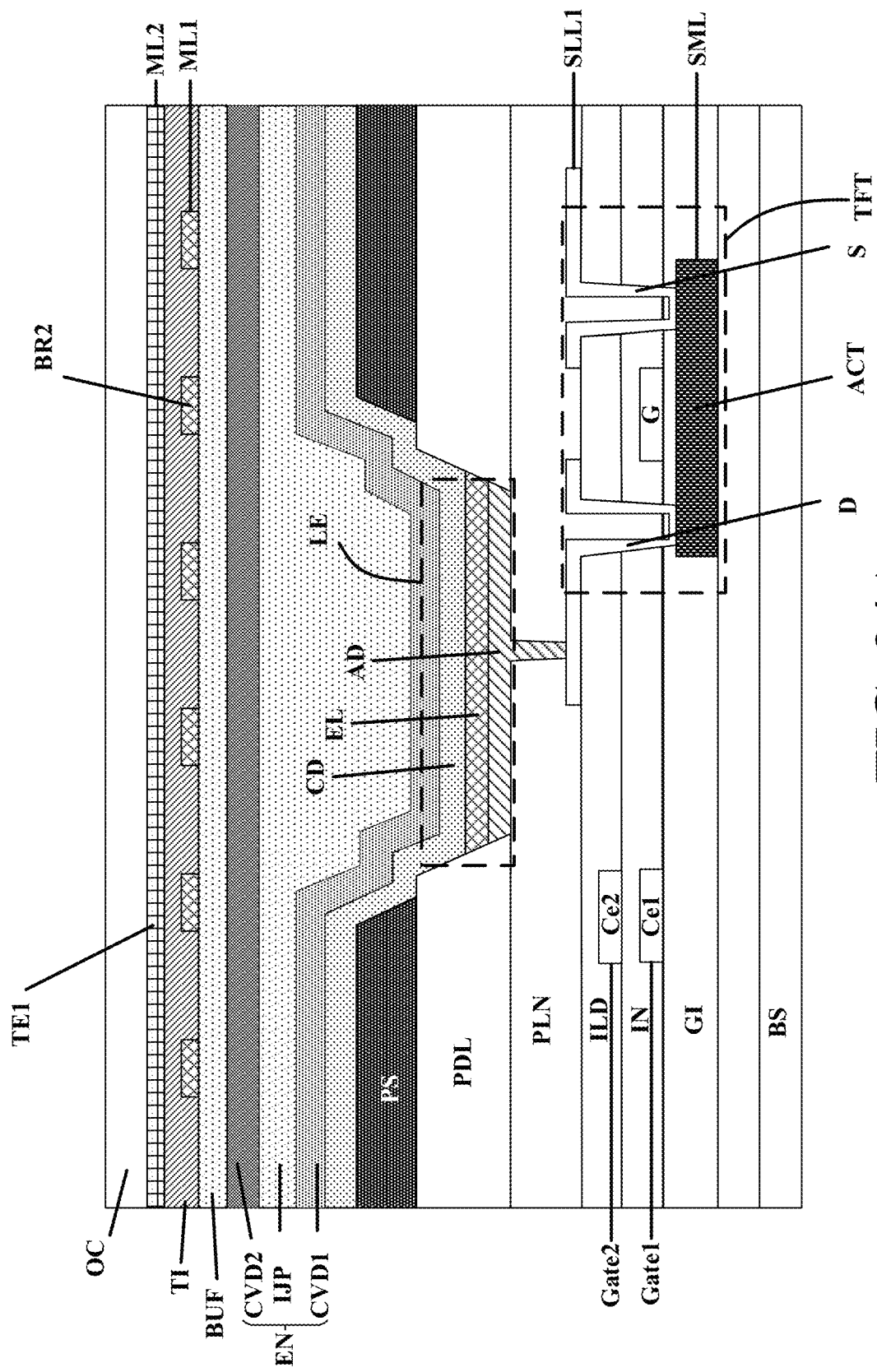
FIG. 24A illustrates a detailed structure in a display area in a display apparatus in some embodiments according to the present disclosure.

FIG. 24A illustrates a detailed structure in a display area in a display apparatus in some embodiments according to the present disclosure. Referring to FIG. 24A, the display apparatus in the display area in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first gate metal layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second gate metal layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first SD metal layer) on a side of the inter-layer dielectric layer ILD away from the gate insulating layer GI; a planarization layer PLN on a side of the source electrode S and the drain electrode D away from the inter-layer dielectric layer ILD; a pixel definition layer PDL defining a subpixel aperture and on a side of the planarization layer PLN away from the base substrate BS; and a light emitting element LE in the subpixel aperture. The light emitting element LE includes an anode AD on a side of the planarization layer PLN away from the inter-layer dielectric layer ILD; a light emitting layer EL on a side of the anode AD away from the planarization layer PLN; and a cathode layer CD on a side of the light emitting layer EL away from the anode AD. The display apparatus in the display area further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display apparatus in the display area further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI.

Figure 24B:
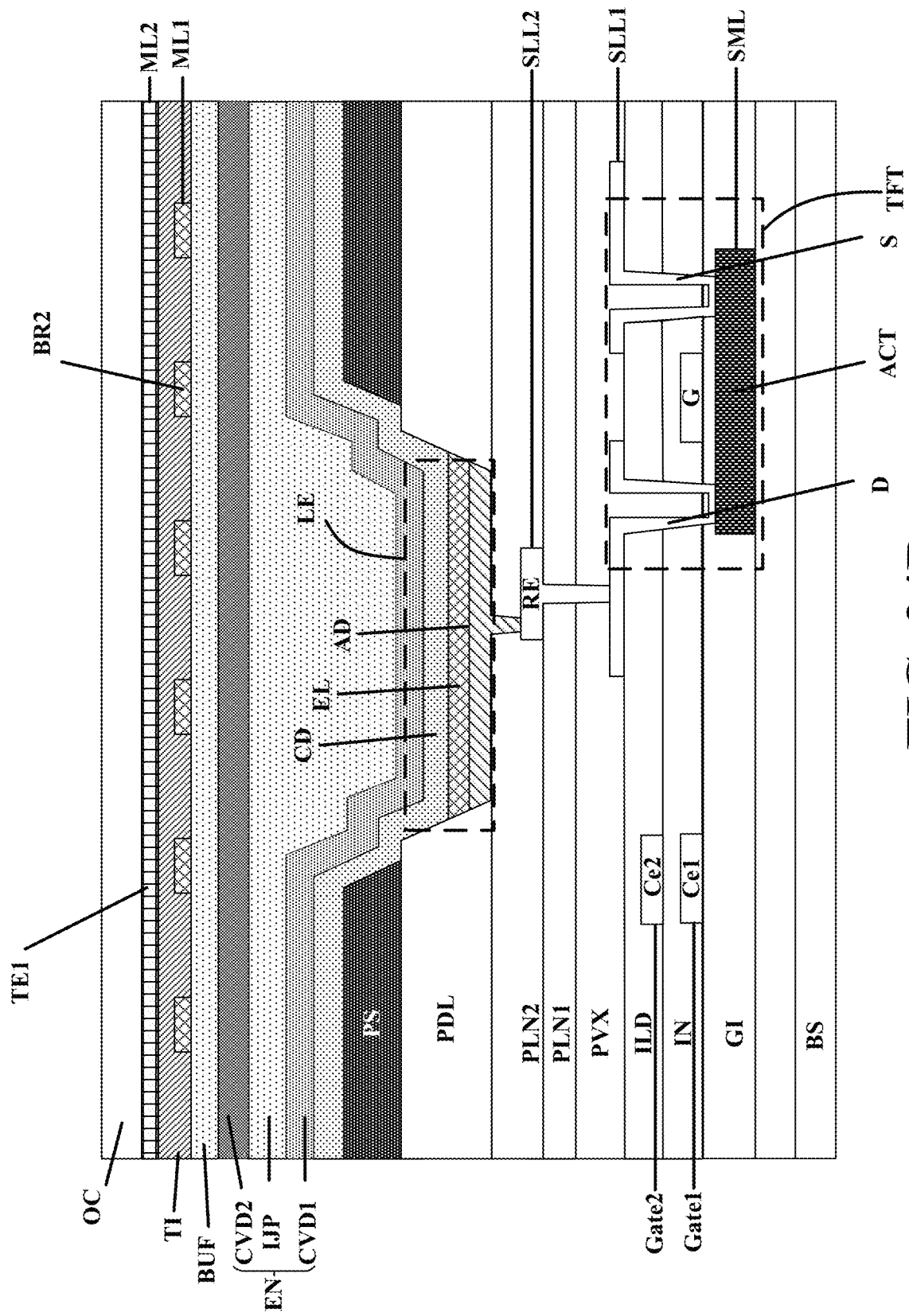
FIG. 24B illustrates a detailed structure in a display area in a display apparatus in some embodiments according to the present disclosure.

FIG. 24B illustrates a detailed structure in a display area in a display apparatus in some embodiments according to the present disclosure. Referring to FIG. 24B, the display apparatus in the display area in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first gate metal layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second gate metal layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first SD metal layer) on a side of the inter-layer dielectric layer ILD away from the gate insulating layer GI; a passivation layer PVX on a side of the source electrode S and the drain electrode D away from the inter-layer dielectric layer ILD; a first planarization layer PLN1 on a side of the passivation layer PVX away from the inter-layer dielectric layer ILD; a relay electrode RE (part of a second SD metal layer) on side of the first planarization layer PLN1 away from the passivation layer PVX; a second planarization layer PLN2 on a side of the relay electrode RE away from the first planarization layer PLN1; a pixel definition layer PDL defining a subpixel aperture and on a side of the second planarization layer PLN2 away from the base substrate BS; and a light emitting element LE in the subpixel aperture. The light emitting element LE includes an anode AD on a side of the second planarization layer PLN2 away from the first planarization layer PLN1; a light emitting layer EL on a side of the anode AD away from the second planarization layer PLN2; and a cathode layer CD on a side of the light emitting layer EL away from the anode AD. The display apparatus in the display area further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display apparatus in the display area further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI. Optionally, the display apparatus in the display area does not include the passivation layer PVX, e.g., the inter-layer dielectric layer ILD is in direct contact with the first planarization layer PLN1.

Referring to FIG. 24A and FIG. 24B, the display apparatus includes a semiconductor material layer SML, a first gate metal layer Gate1, a second gate metal layer Gate2, a first signal line layer SLL1, and a second signal line layer SLL2. The display apparatus further includes an insulating layer IN between the first gate metal layer Gate1 and the second gate metal layer Gate2; an inter-layer dielectric layer ILD between the second conductive layer Gate2 and the first signal line layer SLL1; and at least a passivation layer PVX or a planarization layer PLN between the first signal line layer SLL1 and the second signal line layer SLL2.

In another aspect, the present disclosure provides a method of fabricating a touch control structure. In some embodiments, the method includes forming a plurality of first mesh electrodes and forming a plurality of second mesh electrodes. Optionally, forming a respective one of the plurality of first mesh electrodes includes forming a plurality of first mesh blocks consecutively electrically connected along a first direction. Optionally, two adjacent first mesh blocks of the plurality of first mesh blocks are electrically connected to each other through a respective first conductive bridge of a plurality of first conductive bridges. Optionally, the plurality of first conductive bridges are formed as arranged in an array. Optionally, forming the plurality of first mesh blocks includes forming a border mesh block adjacent to a truncated region in which the touch control structure is absent. Optionally, the method further includes forming a displaced conductive bridge which is displaced from the array of the plurality of first conductive bridges.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch display panel, comprising a plurality of first mesh electrodes and a plurality of second mesh electrodes;
    wherein a respective one of the plurality of first mesh electrodes comprises a plurality of first mesh blocks consecutively electrically connected along a first direction;
    two adjacent first mesh blocks of the plurality of first mesh blocks are electrically connected to each other through a respective first conductive bridge of a plurality of first conductive bridges; and
    the plurality of first conductive bridges are arranged in an array;
    wherein the plurality of first mesh blocks comprises a border mesh block adjacent to a truncated region in which a touch control structure is absent; and
    the touch display panel comprises a displaced conductive bridge which is displaced from the array of the plurality of first conductive bridges;
    wherein the displaced conductive bridge is displaced from an array position to a non-array position;
    the array position and positions of the plurality of first conductive bridges are arranged in rows and columns; and
    the non-array position is displaced from the array of rows and columns;
    wherein the border mesh block has a structure different from at least one first mesh block of the plurality of first mesh blocks in that the border mesh block comprises an extended portion at the array position; and
    mesh lines of the extended portion are in a same layer as mesh lines of the border mesh block outside of the extended portion, and is in a different layer from a first conductive bridge of the plurality of first conductive bridges electrically connected to the at least one first mesh block, the first conductive bridge being at an array position in the array of rows and columns.

2. The touch display panel of claim 1, wherein the truncated region is a window region;
    the window region is at least partially surrounded by a touch control region; and
    the touch control structure is limited in the touch control region and absent in the window region.

3. The touch display panel of claim 1, wherein
    the plurality of first conductive bridges are in a same array comprising rows and columns; and the extended portion and the plurality of first conductive bridges are at a plurality of array positions of the same array, respectively.

4. The touch display panel of claim 2, wherein
    wherein the displaced conductive bridge comprises:
    one or more first conductive extensions electrically connected to the extended portion, the one or more first conductive extensions extending away from the extended portion toward the window region; and
    one or more first conductive plates connected to the one or more first conductive extensions, the one or more first conductive plates at least partially surrounding the window region;
    wherein the one or more first conductive plates are electrically connected to a mesh block of the plurality of first mesh electrodes, the mesh block on a different side of the window region from the border mesh block.

5. The touch display panel of claim 4, wherein the one or more first conductive extensions are in a first mesh line layer;
    the one or more first conductive plates, the border mesh block, the mesh block, mesh blocks of the plurality of first mesh electrodes, and mesh blocks of the plurality of second mesh electrodes are in a second mesh line layer; and
    the touch display panel further comprises a touch insulating layer between the first mesh line layer and the second mesh line layer.

6. The touch display panel of claim 4, wherein the displaced conductive bridge further comprises a first capacitance compensating conductive plate along an edge of the extended portion adjacent to the window region; and
    the first capacitance compensating conductive plate is directly connected to at least one mesh line of the extended portion, and is connected to the one or more first conductive extensions through a via extending through a touch insulating layer.

7. The touch display panel of claim 4, wherein the border mesh block spaces apart two adjacent second mesh blocks of a plurality of second mesh blocks of a respective one of the plurality of second mesh electrodes; and
    a first adjacent second mesh block of the two adjacent second mesh blocks, the border mesh block, and a second adjacent second mesh block of the two adjacent second mesh blocks sequentially surround portions of a perimeter of the window region.

8. The touch display panel of claim 7, wherein the respective one of the plurality of second mesh electrodes comprises a second capacitance compensating conductive plate, a second conductive plate, and a third capacitance compensating conductive plate sequentially connected;

the second capacitance compensating conductive plate is directly connected to at least one mesh line of the first adjacent second mesh block;

the third capacitance compensating conductive plate is directly connected to at least one mesh line of the second adjacent second mesh block; and the second conductive plate connects the second capacitance compensating conductive plate with the third capacitance compensating conductive plate.

9. The touch display panel of claim 8, wherein the second capacitance compensating conductive plate, the second conductive plate, and the third capacitance compensating conductive plate are parts of a unitary structure.

10. The touch display panel of claim 8, wherein the one or more first conductive extensions are in a first mesh line layer;

the second capacitance compensating conductive plate, the second conductive plate, and the third capacitance compensating conductive plate are in a second mesh line layer; and the one or more first conductive extensions crosses over the second conductive plate.

11. The touch display panel of claim 7, wherein, on a first side, the first adjacent second mesh block, the border mesh block, and the second adjacent second mesh block are adjacent to the window region;

on a second side, the first adjacent second mesh block, the border mesh block, and the second adjacent second mesh block are along an edge of the touch control structure;

the touch display panel further comprises:

a first trace line electrically connecting the border mesh block to a touch control integrated circuit, the first trace directly connected to at least one mesh line of the border mesh block;

one or more second conductive extensions electrically connected to the first adjacent second mesh block, the one or more second conductive extensions extending away from the first adjacent second mesh block away from the window region;

one or more third conductive extensions electrically connected to the second adjacent second mesh block, the one or more third conductive extensions extending away from the second adjacent second mesh block away from the window region; and a connecting line connecting the one or more second conductive extensions with the one or more third conductive extensions.

12. The touch display panel of claim 11, wherein the one or more second conductive extensions, the connecting line, and the one or more third conductive extensions are parts of a unitary structure in a first mesh line layer; and the first trace line, the first adjacent second mesh block, the border mesh block, and the second adjacent second mesh block are in a second mesh line layer.

13. The touch display panel of claim 1, wherein the border mesh block is in a corner region of the touch display panel; and the truncated region is a region outside the touch control structure and adjacent to the corner region.

14. The touch display panel of claim 13, wherein the displaced conductive bridge comprises one or more fourth conductive extensions electrically connected to the border mesh block, the one or more fourth conductive extensions extending away from the border mesh block toward the region outside the touch control structure; and the one or more fourth conductive extensions are electrically connected to a second trace line, the second trace line electrically connected to a touch control integrated circuit.

15. The touch display panel of claim 14, wherein the displaced conductive bridge further comprises a fourth capacitance compensating conductive plate directly connected to at least one mesh line of the border mesh block;

the fourth capacitance compensating conductive plate is electrically connected to the one or more fourth conductive extensions;

the one or more fourth conductive extensions are in a first mesh line layer; and the border mesh block, the fourth capacitance compensating conductive plate, and the second trace line are in a second mesh line layer.

16. The touch display panel of claim 14, further comprising a third trace line electrically connected to a mesh block of the plurality of second mesh electrodes;

wherein the third trace line is between the second trace line and the border mesh block; and the one or more fourth conductive extensions cross over the third trace line.

17. A display apparatus, comprising a display panel and the touch display panel of claim 1.

* * * * *